US012563510B2

(12) United States Patent
Kung et al.

(10) Patent No.: US 12,563,510 B2
(45) Date of Patent: Feb. 24, 2026

(54) METHOD AND APPARATUS FOR TIME ALIGNMENT REGARDING MULTI-TRP IN A WIRELESS COMMUNICATION SYSTEM

(71) Applicant: ASUS Technology Licensing Inc., Taipei (TW)

(72) Inventors: Yi-Hsuan Kung, Taipei (TW); Yu-Hsuan Guo, Taipei (TW)

(73) Assignee: ASUS Technology Licensing Inc., Taipei (TW)

( * ) Notice: Subject to any disclaimer, the term of this patent is extended or adjusted under 35 U.S.C. 154(b) by 279 days.

(21) Appl. No.: 18/140,861

(22) Filed: Apr. 28, 2023

(65) Prior Publication Data

US 2023/0362853 A1    Nov. 9, 2023

Related U.S. Application Data

(60) Provisional application No. 63/338,705, filed on May 5, 2022.

(51) Int. Cl.
| | |
|---|---|
| *H04W 56/00* | (2009.01) |
| *H04W 36/08* | (2009.01) |
| *H04W 74/0833* | (2024.01) |
| *H04W 74/0838* | (2024.01) |

(52) U.S. Cl.
CPC ....... *H04W 56/0015* (2013.01); *H04W 36/08* (2013.01); *H04W 74/0833* (2013.01); *H04W 74/0838* (2024.01)

(58) Field of Classification Search
None
See application file for complete search history.

(56) References Cited

U.S. PATENT DOCUMENTS

| | | | | |
|---|---|---|---|---|
| 10,455,531 | B2 * | 10/2019 | Tsai | H04W 56/0045 |
| 2021/0409091 | A1 * | 12/2021 | Svedman | H04L 5/0051 |
| 2022/0131642 | A1 * | 4/2022 | Kim | H04L 5/005 |
| 2022/0150011 | A1 * | 5/2022 | Kim | H04L 1/00 |
| 2022/0210825 | A1 * | 6/2022 | Zhu | H04W 74/0833 |
| 2022/0394805 | A1 * | 12/2022 | Chen | H04W 72/30 |
| 2023/0180166 | A1 * | 6/2023 | Rudolf | H04W 56/0005 |
| | | | | 370/280 |
| 2023/0362853 | A1 * | 11/2023 | Kung | H04W 36/08 |

* cited by examiner

*Primary Examiner* — Faiyazkhan Ghafoerkhan

(74) *Attorney, Agent, or Firm* — Skaar Ulbrich Macari, P.A.

(57) ABSTRACT

Methods, systems, and apparatuses are provided for a User Equipment (UE) in a wireless communication system receiving, from a network, a first signaling indicative of cell configuration of a cell, receiving, from the network, a second signaling indicative of switching a Special Cell (SpCell) of the UE to the cell or adding the cell as a serving cell, receiving, from the network, a third signaling indicative of a first time alignment information associated with the first Timing Advance Group (TAG), and in response to the second signaling: (1) switching the SpCell of the UE to the cell or adding the cell as the serving cell, (2) applying the first time alignment information on the first TAG, and (3) initiating a random access procedure on the cell when no time alignment information associated with the second TAG is in the third signaling.

20 Claims, 15 Drawing Sheets

PROGRAM CODE *312*

APPLICATION LAYER *400*

LAYER 3 *402*

LAYER 2 *404*

LAYER 1 *406*

| Downlink frame $i$ |
| Uplink frame $i$ |

$T_{TA}$

| | | |
|---|---|---|
| ... | | |
| | Source TAG id=X | Target TAG id=Y |
| ... | | |

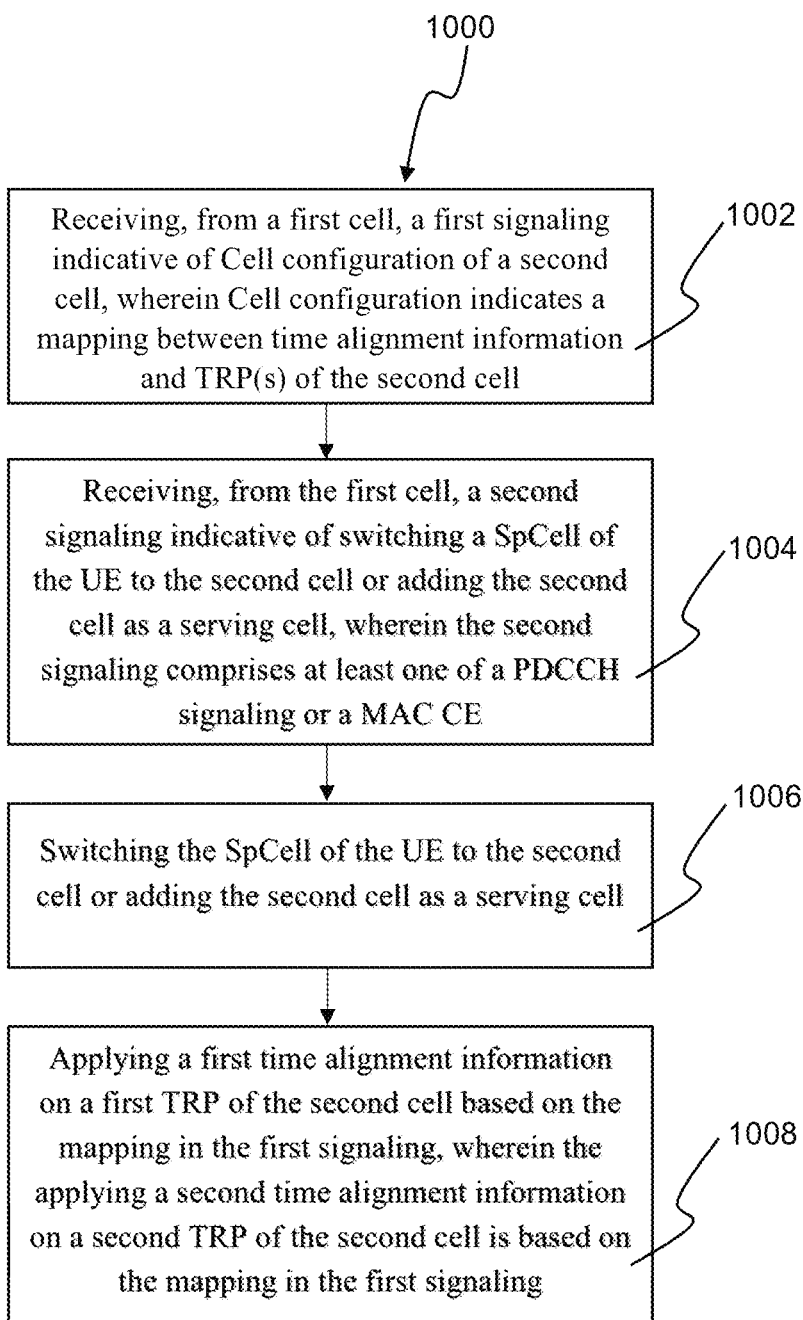

1000

Receiving, from a first cell, a first signaling indicative of Cell configuration of a second cell, wherein Cell configuration indicates a mapping between time alignment information and TRP(s) of the second cell  1002

Receiving, from the first cell, a second signaling indicative of switching a SpCell of the UE to the second cell or adding the second cell as a serving cell, wherein the second signaling comprises at least one of a PDCCH signaling or a MAC CE  1004

Switching the SpCell of the UE to the second cell or adding the second cell as a serving cell  1006

Applying a first time alignment information on a first TRP of the second cell based on the mapping in the first signaling, wherein the applying a second time alignment information on a second TRP of the second cell is based on the mapping in the first signaling  1008

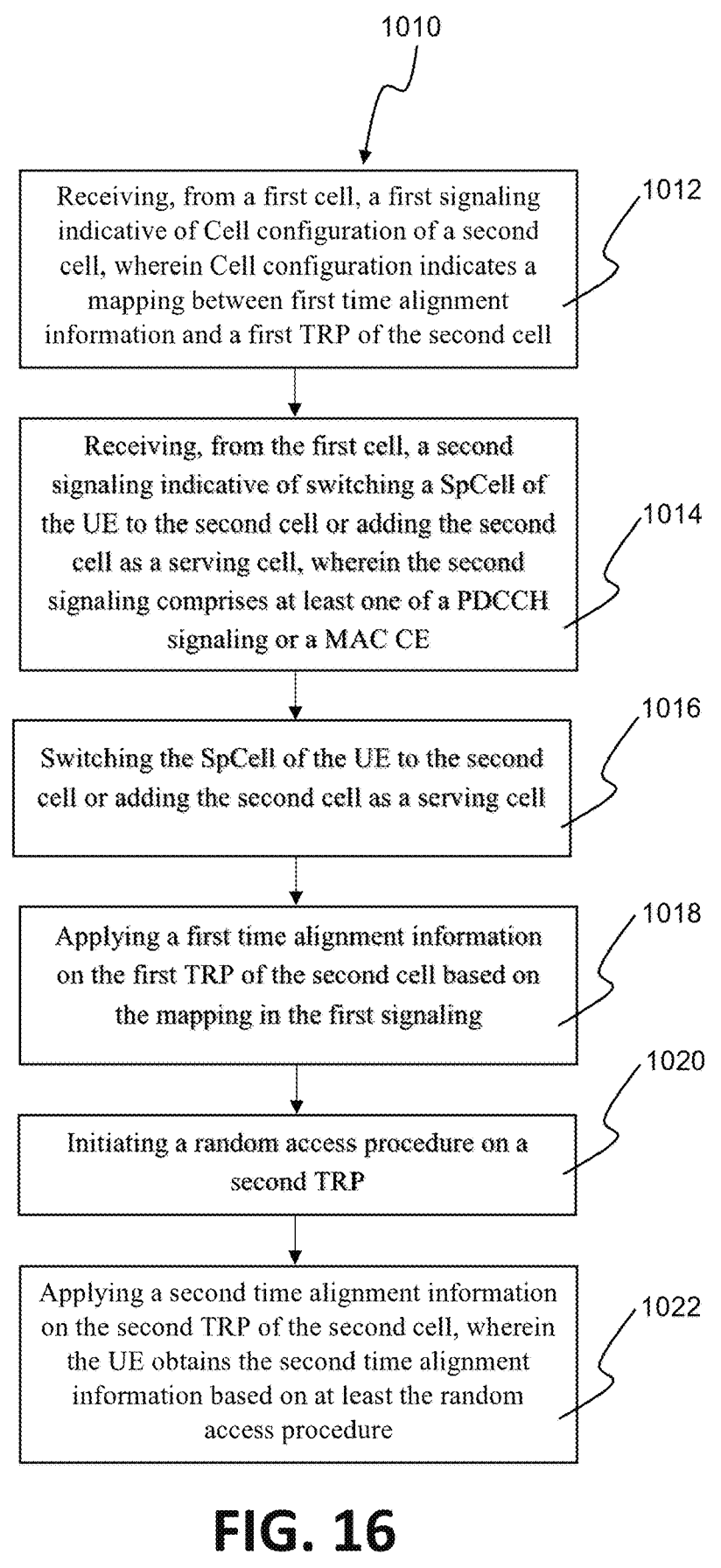

Receiving, from a first cell, a first signaling indicative of Cell configuration of a second cell, wherein Cell configuration indicates a mapping between first time alignment information and a first TRP of the second cell     1012

Receiving, from the first cell, a second signaling indicative of switching a SpCell of the UE to the second cell or adding the second cell as a serving cell, wherein the second signaling comprises at least one of a PDCCH signaling or a MAC CE     1014

Switching the SpCell of the UE to the second cell or adding the second cell as a serving cell     1016

Applying a first time alignment information on the first TRP of the second cell based on the mapping in the first signaling     1018

Initiating a random access procedure on a second TRP     1020

Applying a second time alignment information on the second TRP of the second cell, wherein the UE obtains the second time alignment information based on at least the random access procedure     1022

FIG. 16

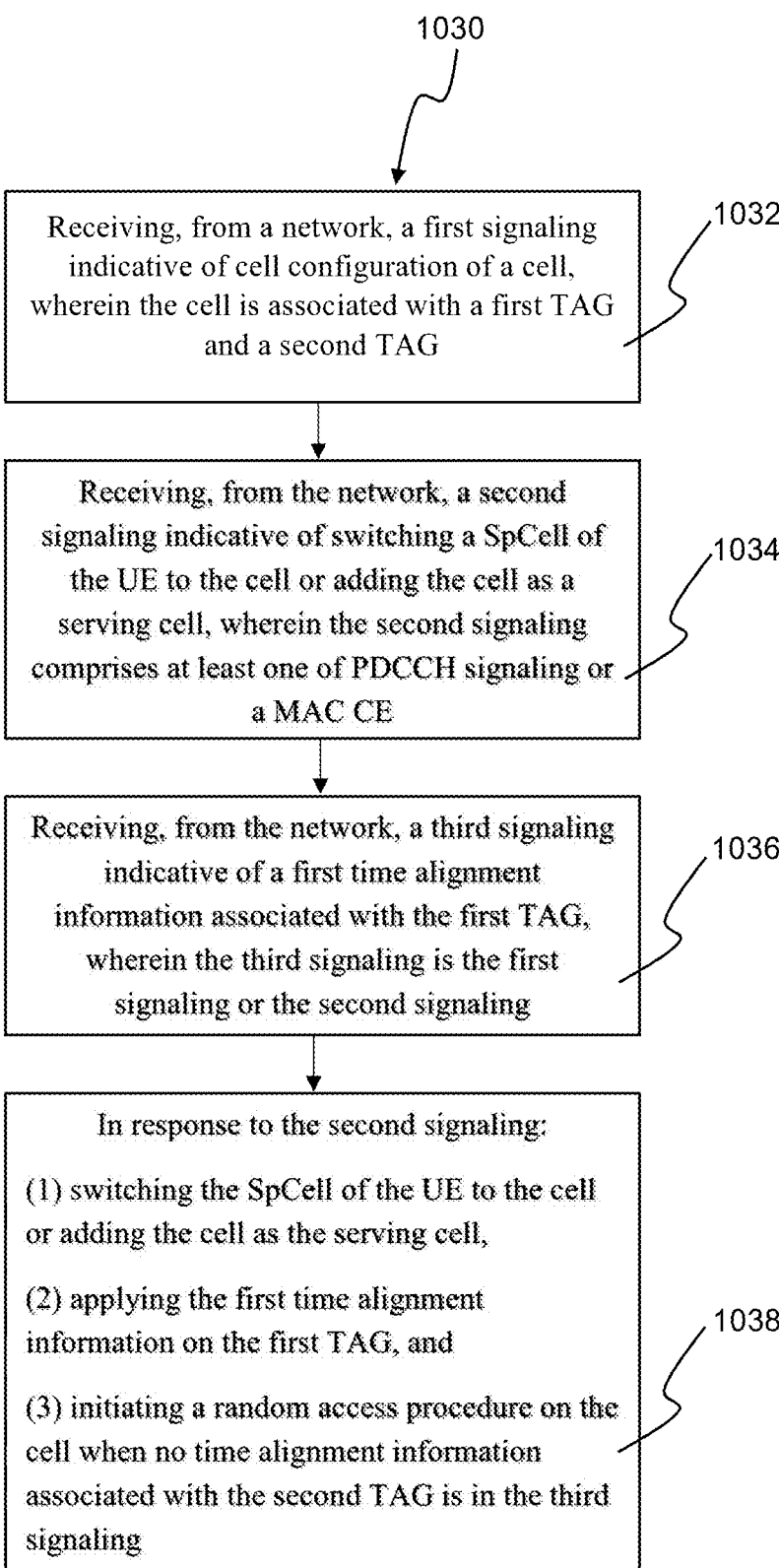

1030

Receiving, from a network, a first signaling indicative of cell configuration of a cell, wherein the cell is associated with a first TAG and a second TAG — 1032

Receiving, from the network, a second signaling indicative of switching a SpCell of the UE to the cell or adding the cell as a serving cell, wherein the second signaling comprises at least one of PDCCH signaling or a MAC CE — 1034

Receiving, from the network, a third signaling indicative of a first time alignment information associated with the first TAG, wherein the third signaling is the first signaling or the second signaling — 1036

In response to the second signaling:

(1) switching the SpCell of the UE to the cell or adding the cell as the serving cell, (2) applying the first time alignment information on the first TAG, and (3) initiating a random access procedure on the cell when no time alignment information associated with the second TAG is in the third signaling — 1038

FIG. 17

METHOD AND APPARATUS FOR TIME ALIGNMENT REGARDING MULTI-TRP IN A WIRELESS COMMUNICATION SYSTEM

CROSS-REFERENCE TO RELATED APPLICATIONS

The present Application claims priority to and the benefit of U.S. Provisional Patent Application Ser. No. 63/338,705, filed May 5, 2022, which is fully incorporated herein by reference.

FIELD

This disclosure generally relates to wireless communication networks and, more particularly, to a method and apparatus for time alignment regarding multi-TRP in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

Methods, systems, and apparatuses are provided for time alignment regarding multi-Transmission and Reception Point (TRP) in a wireless communication system. The present invention introduces and provides methods and systems for handling time alignment for multi-TRP (with multiple/two timing alignments (TAs)) in L1/L2 mobility procedures.

In various embodiments, a method for a User Equipment (UE) in a wireless communication system comprises receiving, from a network, a first signaling indicative of cell configuration of a cell, wherein the cell is associated with a first Timing Advance Group (TAG) and a second TAG, receiving, from the network, a second signaling indicative of switching a Special Cell (SpCell) of the UE to the cell or adding the cell as a serving cell, wherein the second signaling comprises at least one of Physical Downlink Control Channel (PDCCH) signaling or a Medium Access Control (MAC) Control Element (CE), and receiving, from the network, a third signaling indicative of a first time alignment information associated with the first TAG, wherein the third signaling is the first signaling or the second signaling, and in response to the second signaling: (1) switching the SpCell of the UE to the cell or adding the cell as the serving cell, (2) applying the first time alignment information on the first TAG, and (3) initiating a random access procedure on the cell when no time alignment information associated with the second TAG is in the third signaling.

BRIEF DESCRIPTION OF THE DRAWINGS

FIG. 15 is a flow diagram of a UE receiving, from a first cell, a first signaling indicative of Cell configuration of a second cell, receiving, from the first cell, a second signaling indicative of switching a SpCell of the UE to the second cell or adding the second cell as a serving cell, switching the SpCell of the UE to the second cell or adding the second cell as a serving cell, and applying a first time alignment information on a first TRP of the second cell based on the mapping in the first signaling, in accordance with embodiments of the present invention.

FIG. 16 is a flow diagram of a UE receiving, from a first cell, a first signaling indicative of Cell configuration of a second cell, receiving, from the first cell, a second signaling indicative of switching a SpCell of the UE to the second cell or adding the second cell as a serving cell, switching the SpCell of the UE to the second cell or adding the second cell as a serving cell, applying a first time alignment information on the first TRP of the second cell based on the mapping in the first signaling, initiating a random access procedure on a second TRP, and applying a second time alignment information on the second TRP of the second cell, in accordance with embodiments of the present invention.

FIG. 17 is a flow diagram of a UE receiving, from a network, a first signaling indicative of cell configuration of a cell, receiving, from the network, a second signaling indicative of switching a SpCell of the UE to the cell or adding the cell as a serving cell, receiving, from the network, a third signaling indicative of a first time alignment information associated with the first TAG, and in response to the second signaling: (1) switching the SpCell of the UE to the cell or adding the cell as the serving cell, (2) applying the first time alignment information on the first TAG, and (3) initiating a random access procedure on the cell when no time alignment information associated with the second TAG is in the third signaling, in accordance with embodiments of the present invention.

DETAILED DESCRIPTION

The invention described herein can be applied to or implemented in exemplary wireless communication systems and devices described below. In addition, the invention is described mainly in the context of the 3GPP architecture reference model. However, it is understood that with the disclosed information, one skilled in the art could easily adapt for use and implement aspects of the invention in a 3GPP2 network architecture as well as in other network architectures.

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A (Long Term Evolution Advanced) wireless access, 3GPP2 UMB (Ultra Mobile Broadband), WiMax, 3GPP NR (New Radio), or some other modulation techniques.

In particular, the exemplary wireless communication systems and devices described below may be designed to support one or more standards such as the standard offered by a consortium named "3rd Generation Partnership Project" referred to herein as 3GPP, including: [1] RP-212710 NR further mobility enhancements; [2]3GPP specification 38.331 v16.7.0; [3]3GPP specification 38.321 v16.7.0; [4] RP-213598 Work Item Description: MIMO Evolution for Downlink and Uplink; [5]R2-2203809 Introduction of Release-17 FeMIMO; and [6]3GPP specification 38.211 v17.1.0. The standards and documents listed above are hereby expressly and fully incorporated herein by reference in their entirety.

Figure 1:
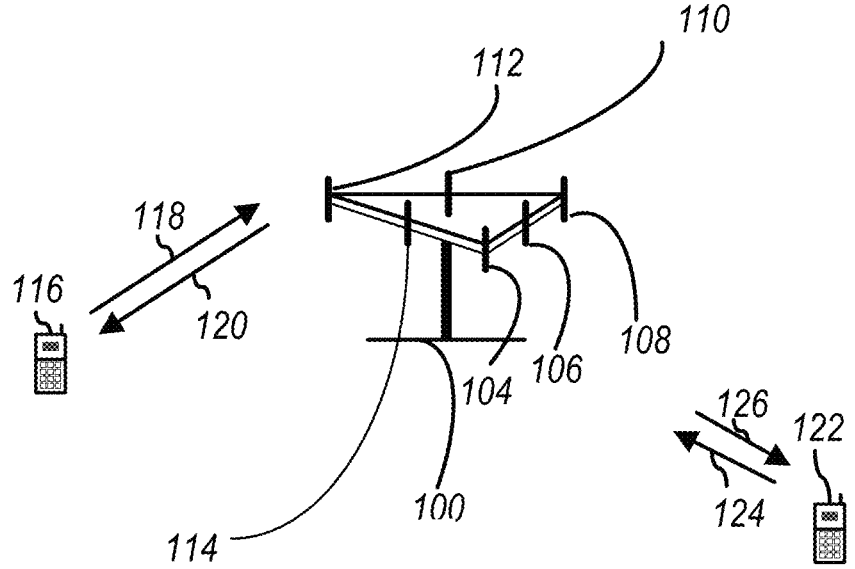
FIG. 1 shows a diagram of a wireless communication system, in accordance with embodiments of the present invention.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal (AT) 116 is in communication with antennas 112 and 114, where antennas 112 and 114 transmit information to access terminal 116 over forward link 120 and receive information from AT 116 over reverse link 118. AT 122 is in communication with antennas 106 and 108, where antennas 106 and 108 transmit information to AT 122 over forward link 126 and receive information from AT 122 over reverse link 124. In a FDD system, communication links 118, 120, 124 and 126 may use different frequency for communication. For example, forward link 120 may use a different frequency than that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage normally causes less interference to access terminals in neighboring cells than an access network transmitting through a single antenna to all its access terminals.

The AN may be a fixed station or base station used for communicating with the terminals and may also be referred to as an access point, a Node B, a base station, an enhanced base station, an eNodeB, or some other terminology. The AT may also be called User Equipment (UE), a wireless communication device, terminal, access terminal or some other terminology.

Figure 2:
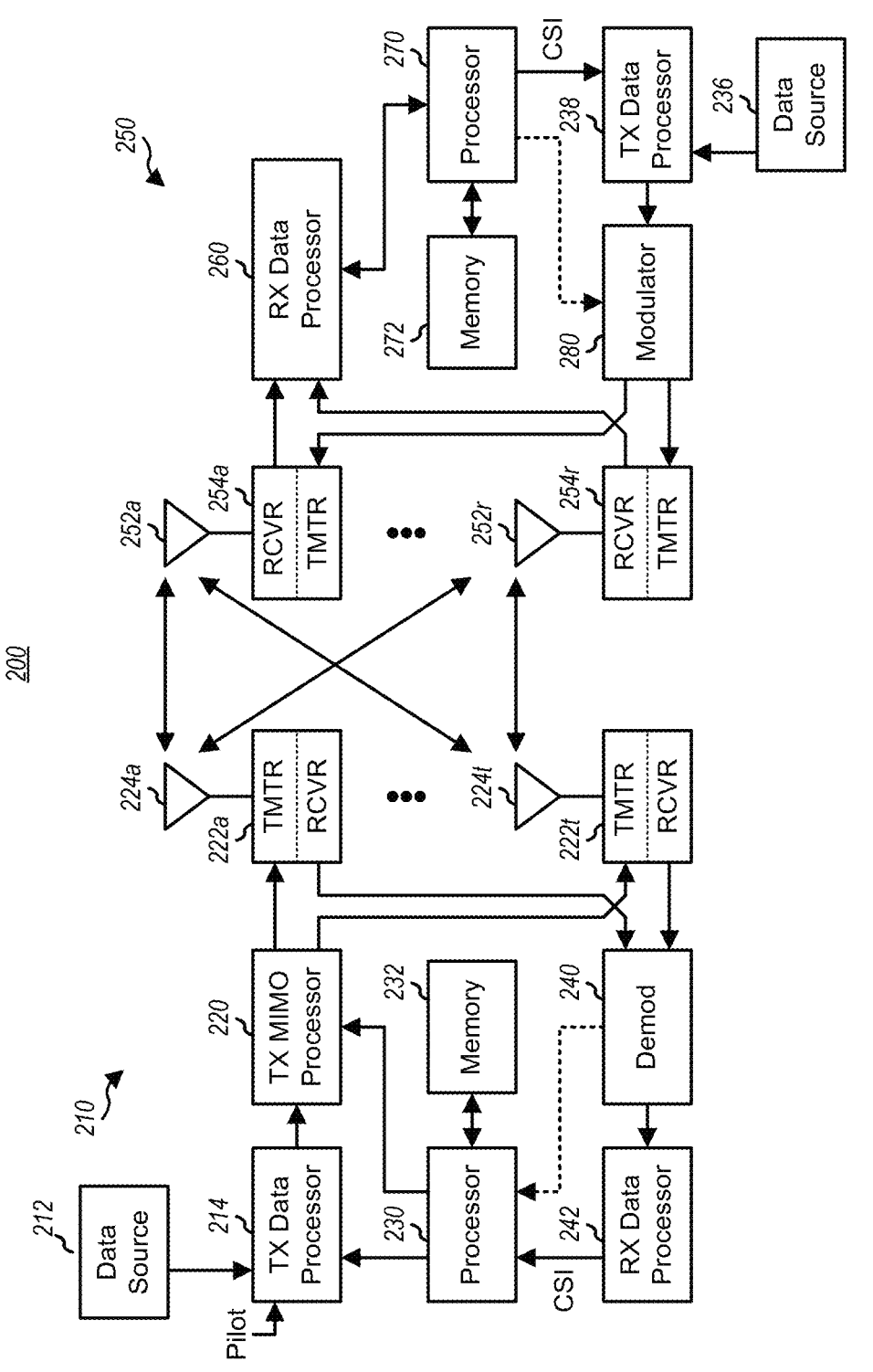
FIG. 2 is a block diagram of a transmitter system (also known as access network) and a receiver system (also known as user equipment or UE), in accordance with embodiments of the present invention.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230. A memory 232 is coupled to processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Memory 232 may be used to temporarily store some buffered/computational data from 240 or 242 through Processor 230, store some buffed data from 212, or store some specific program codes. And Memory 272 may be used to temporarily store some buffered/computational data from 260 through Processor 270, store some buffed data from 236, or store some specific program codes.

Figure 3:
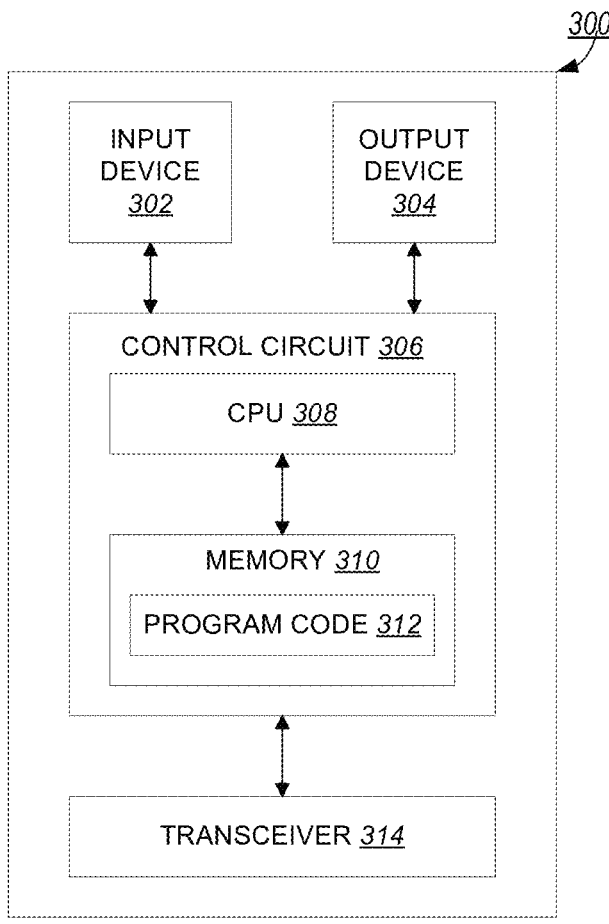
FIG. 3 is a functional block diagram of a communication system, in accordance with embodiments of the present invention.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly.

Figure 4:
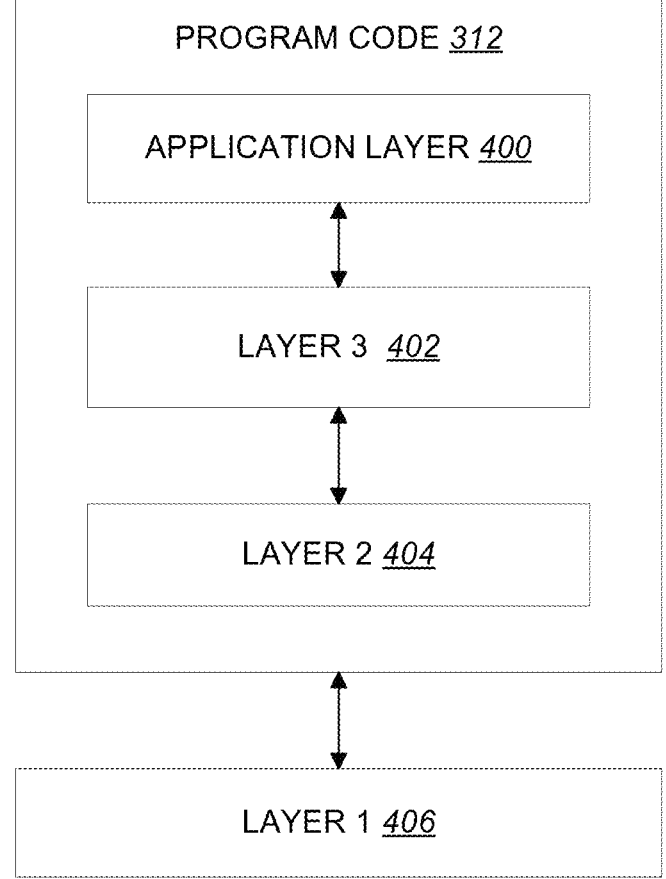
FIG. 4 is a functional block diagram of the program code of FIG. 3, in accordance with embodiments of the present invention.

FIG. 4 is a simplified block diagram of the program code 312 shown in FIG. 3 in accordance with an embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

For LTE, LTE-A, or $N_R$ systems, the Layer 2 portion 404 may include a Radio Link Control (RLC) layer and a Medium Access Control (MAC) layer. The Layer 3 portion 402 may include a Radio Resource Control (RRC) layer.

Any two or more than two of the following paragraphs, (sub-)bullets, points, actions, or claims described in each invention paragraph or section may be combined logically, reasonably, and properly to form a specific method.

Any sentence, paragraph, (sub-)bullet, point, action, or claim described in each of the following invention paragraphs or sections may be implemented independently and separately to form a specific method or apparatus. Dependency, e.g., "based on", "more specifically", "example", etc., in the following invention disclosure is just one possible embodiment which would not restrict the specific method or apparatus.

In New WID on NR further mobility enhancements (e.g., [1] RP-212710 NR further mobility enhancements), objectives for enhancement on mobility for NR are discussed:

3 Justification

When the UE passes from the coverage area of one cell to another cell, at some point a serving cell change need to be performed. Currently serving cell change is triggered by L3 measurements and is done by RRC signalling triggered Reconfiguration with Synch for change of PCell and PSCell, as well as release add for SCells when applicable, all cases with complete L2 (and L1) resets, and involving more latency, more overhead and more interruption time than beam switch mobility. The goal of L1/L2 mobility enhancements is to be able to do serving cell change via L1/L2 signalling with such low latency, low overhead and low interruption time.

4 Objective 4.1 Objective of Core Part WI

The detailed objective of this work item are:
1. To specify mechanism and procedures of L1/L2 based inter-cell mobility for mobility latency reduction:
   Configuration and maintenance for multiple candidate cells to allow fast application of configurations for candidate cells [RAN2, RAN3]
   Dynamic switch mechanism among candidate serving cells (including SpCell and SCell) for the potential applicable scenarios based on L1/L2 signalling [RAN2, RAN1]
   L1 enhancements, including inter-cell beam management, L1 measurement and reporting, beam indication, and for non-synchronized scenario to handle TA management [RAN1, RAN2]
   CU-DU interface signaling to support L1/L2 mobility, if needed [RAN3]
   Note 1: FR2 specific enhancements are not precluded, if any.
   Note 2: The procedure of L1/L2 based inter-cell mobility are applicable to the following scenarios:
   Standalone, CA and NR-DC case with serving cell change within one CG
   Intra-CU case and intra-CU inter-DU case (applicable for Standalone and CA)
   Both intra-frequency and inter-frequency
   Both FR1 and FR2
   In 3GPP specification 38.331 (e.g., [2]3GPP specification 38.331 v16.7.0), reconfiguration with sync (handover), and SCell addition are introduced:

3.1 Definitions

Primary Cell: The MCG cell, operating on the primary frequency, in which the UE either performs the initial connection establishment procedure or initiates the connection re-establishment procedure.
Primary SCG Cell: For dual connectivity operation, the SCG cell in which the UE performs random access when performing the Reconfiguration with Sync procedure.
Secondary Cell: For a UE configured with CA, a cell providing additional radio resources on top of Special Cell.
Secondary Cell Group: For a UE configured with dual connectivity, the subset of serving cells comprising of the PSCell and zero or more secondary cells.
Serving Cell: For a UE in RRC_CONNECTED not configured with CA/DC there is only one serving cell comprising of the primary cell. For a UE in RRC_CONNECTED configured with CA/DC the term 'serving cells' is used to denote the set of cells comprising of the Special Cell(s) and all secondary cells.
Special Cell: For Dual Connectivity operation the term Special Cell refers to the PCell of the MCG or the PSCell of the SCG, otherwise the term Special Cell refers to the PCell.
5.3.5.5 Cell Group configuration
5.3.5.5.1 General
The network configures the UE with Master Cell Group (MCG), and zero or one Secondary Cell Group (SCG). In (NG)EN-DC, the MCG is configured as specified in TS 36.331 [10], and for NE-DC, the SCG is configured as specified in TS 36.331 [10]. The network provides the configuration parameters for a cell group in the CellGroupConfig IE.

The UE performs the following actions based on a received CellGroupConfig IE:
1> if the CellGroupConfig contains the spCellConfig with reconfigurationWithSync:
2> perform Reconfiguration with sync according to 5.3.5.5.2;
2> resume all suspended radio bearers except the SRBs for the source cell group, and resume SCG transmission for all radio bearers, and resume BH RLC channels and resume SCG transmission for BH RLC channels for IAB-MT, if suspended;

. . .

5.3.5.5.2 Reconfiguration with Sync
The UE shall perform the following actions to execute a reconfiguration with sync.
1> if the AS security is not activated, perform the actions upon going to RRC_IDLE as specified in 5.3.11 with the release cause 'other' upon which the procedure ends;
1> if no DAPS bearer is configured:
2> stop timer T310 for the corresponding SpCell, if running;
1> if this procedure is executed for the MCG:
2> if timer T316 is running;
3> stop timer T316;
3> clear the information included in VarRLF-Report, if any;
2> resume MCG transmission, if suspended.
1> stop timer T312 for the corresponding SpCell, if running;
1> start timer T304 for the corresponding SpCell with the timer value set to t304, as included in the reconfigurationWithSync;
1> if the frequencyInfoDL is included:
2> consider the target SpCell to be one on the SSB frequency indicated by the frequencyInfoDL with a physical cell identity indicated by the physCellId;
1> else:
2> consider the target SpCell to be one on the SSB frequency of the source SpCell with a physical cell identity indicated by the physCellId;
1> start synchronising to the DL of the target SpCell;
1> apply the specified BCCH configuration defined in 9.1.1.1 for the target SpCell;
1> acquire the MIB of the target SpCell, which is scheduled as specified in TS 38.213 [13];
[ . . . ]
2> reset the MAC entity of this cell group;
2> consider the SCell(s) of this cell group, if configured, that are not included in the SCellToAddModList in the RRCReconfiguration message, to be in deactivated state;
2> apply the value of the newUE-Identity as the C-RNTI for this cell group;
2> configure lower layers in accordance with the received spCellConfigCommon;
2> configure lower layers in accordance with any additional fields, not covered in the previous, if included in the received reconfigurationWithSync.
In 38.331 (e.g., [2]3GPP specification 38.331 v16.7.0), Cell group and Serving Cell configuration is introduced, including TAG configuration:

CellGroupConfig

The CellGroupConfig IE is used to configure a master cell group (MCG) or secondary cell group (SCG). A cell group comprises of one MAC entity, a set of logical channels with associated RLC entities and of a primary cell (SpCell) and one or more secondary cells (SCells).

| CellGroupConfig information element |
| --- |

```
CellGroupConfig ::=              SEQUENCE {
    cellGroupId                      CellGroupId,
    rlc-BearerToAddModList           SEQUENCE (SIZE(1..maxLC-ID)) OF RLC-BearerConfig
OPTIONAL, -- Need N
    rlc-BearerToReleaseList          SEQUENCE (SIZE(1..maxLC-ID)) OF LogicalChannelIdentity
OPTIONAL, -- Need N
    mac-CellGroupConfig              MAC-CellGroupConfig
OPTIONAL, -- Need M
    physicalCellGroupConfig          PhysicalCellGroupConfig
OPTIONAL, -- Need M
    spCellConfig                     SpCellConfig
OPTIONAL, -- Need M
    sCellToAddModList                SEQUENCE (SIZE (1..maxNrofSCells)) OF SCellConfig
OPTIONAL, -- Need N
    sCellToReleaseList               SEQUENCE (SIZE (1..maxNrofSCells)) OF SCellIndex
OPTIONAL, -- Need N
    ...,
    ...
}
-- Serving cell specific MAC and PHY parameters for a SpCell:
SpCellConfig ::=                 SEQUENCE {
    servCellIndex                    ServCellIndex
OPTIONAL, -- Cond SCG
    reconfigurationWithSync          ReconfigurationWithSync
OPTIONAL, -- Cond ReconfWithSync
    rlf-TimersAndConstants           SetupRelease { RLF-TimersAndConstants }
OPTIONAL, -- Need M
    rlmInSyncOutOfSyncThreshold      ENUMERATED {n1}
OPTIONAL, -- Need S
    spCellConfigDedicated            ServingCellConfig
OPTIONAL, -- Need M
    ...
}
ReconfigurationWithSync ::=      SEQUENCE {
    spCellConfigCommon               ServingCellConfigCommon
OPTIONAL, -- Need M
    newUE-Identity                   RNTI-Value,
    t304                             ENUMERATED {ms50, ms100, ms150, ms200, ms500, ms1000, ms2000,
ms10000},
    rach-ConfigDedicated             CHOICE {
        uplink                           RACH-ConfigDedicated,
        supplementaryUplink              RACH-ConfigDedicated
    }
OPTIONAL, -- Need N
    ...,
}
SCellConfig ::=                  SEQUENCE {
    sCellIndex                       SCellIndex,
    sCellConfigCommon                ServingCellConfigCommon
OPTIONAL, -- Cond SCellAdd
    sCellConfigDedicated             ServingCellConfig
OPTIONAL, -- Cond SCellAddMod
    ...,
    [[
    smtc                             SSB-MTC
OPTIONAL -- Need S
    ]],
    [[
    sCellState-r16                   ENUMERATED {activated}
OPTIONAL, -- Cond SCellAddSync
    secondaryDRX-GroupConfig-r16     ENUMERATED {true}
OPTIONAL -- Cond DRX-Config2
    ]]}
```

| CellGroupConfig field descriptions |
| --- |
| mac-CellGroupConfig |
| MAC parameters applicable for the entire cell group. |
| sCellState |
| Indicates whether the SCell shall be considered to be in activated state upon SCell configuration. |
| sCellToAddModList |
| List of secondary serving cells (SCells) to be added or modified. |
| sCellToReleaseList |
| List of secondary serving cells (SCells) to be released. |

-continued

| CellGroupConfig field descriptions |
| --- |
| secondaryDRX-GroupConfig |
| The field is used to indicate whether the SCell belongs to the secondary DRX group. All serving cells in the secondary DRX group shall belong to one Frequency Range and all serving cells in the legacy DRX group shall belong to another Frequency Range. |
| spCellConfig |
| Parameters for the SpCell of this cell group (PCell of MCG or PSCell of SCG). |

| ReconfigurationWithSync field descriptions |
| --- |
| rach-ConfigDedicated |
| Random access configuration to be used for the reconfiguration with sync (e.g. handover). The UE performs the RA according to these parameters in the firstActiveUplinkBWP (see UplinkConfig). |
| smtc |
| The SSB periodicity/offset/duration configuration of target cell for NR PSCell change and NR PCell change. The network sets the periodicityAndOffset to indicate the same periodicity as ssb-periodicityServingCell in spCellConfigCommon.<br>For case of NR PCell change, the smtc is based on the timing reference of (source) PCell. For case of NR PSCell change, it is based on the timing reference of source PSCell.<br>If both this field and targetCellSMTC-SCG are absent, the UE uses the SMTC in the measObjectNR having the same SSB frequency and subcarrier spacing, as configured before the reception of the RRC message. |

| SpCellConfig field descriptions |
| --- |
| reconfigurationWithSync |
| Parameters for the synchronous reconfiguration to the target SpCell. |
| servCellIndex |
| Serving cell ID of a PSCell. The PCell of the Master Cell Group uses ID = 0. |

In introduction of FeMIMO for RRC specification (e.g., [5]R2-2203809 Introduction of Release-17 feMIMO), measurement object and serving cell configuration for additional Cell(s) are introduced:

ServingCellConfig

The IE ServingCellConfig is used to configure (add or modify) the UE with a serving cell, which may be the SpCell or an SCell of an MCG or SCG. The parameters herein are mostly UE specific but partly also cell specific (e.g. in additionally configured bandwidth parts). Reconfiguration between a PUCCH and PUCCHless SCell is only supported using an SCell release and add.

| ServingCellConfig information element |
| --- |

```
ServingCellConfig ::=           SEQUENCE {
    tdd-UL-DL-ConfigurationDedicated      TDD-UL-DL-ConfigDedicated
OPTIONAL, -- Cond TDD
    initialDownlinkBWP                    BWP-DownlinkDedicated
OPTIONAL, -- Need M
    downlinkBWP-ToReleaseList             SEQUENCE (SIZE (1..maxNrofBWPs)) OF BWP-Id
OPTIONAL, -- Need N
    downlinkBWP-ToAddModList              SEQUENCE (SIZE (1..maxNrofBWPs)) OF BWP-Downlink
OPTIONAL, -- Need N
    firstActiveDownlinkBWP-Id             BWP-Id
```

-continued

| ServingCellConfig information element |
|---|

```
OPTIONAL, -- Cond SyncAndCellAdd
    bwp-InactivityTimer                     ENUMERATED {ms2, ms3, ms4, ms5, ms6, ms8, ms10, ms20, ms30,
                                                         ms40, ms50, ms60, ms80, ms100, ms200, ms300, ms500,
                                                         ms750, ms1280, ms1920, ms2560, spare10, spare9,
spare8,
                                                         spare7, spare6, spare5, spare4, spare3, spare2,
spare1 }      OPTIONAL, -- Need R
    defaultDownlinkBWP-Id                   BWP-Id
OPTIONAL, -- Need S
    uplinkConfig                            UplinkConfig
OPTIONAL, -- Need M
    supplementaryUplink                     UplinkConfig
OPTIONAL, -- Need M
    pdcch-ServingCellConfig                 SetupRelease { PDCCH-ServingCellConfig }
OPTIONAL, -- Need M
    pdsch-ServingCellConfig                 SetupRelease { PDSCH-ServingCellConfig }
OPTIONAL, -- Need M
    csi-MeasConfig                          SetupRelease { CSI-MeasConfig }
OPTIONAL, -- Need M
    sCellDeactivationTimer                  ENUMERATED {ms20, ms40, ms80, ms160, ms200, ms240,
                                                         ms320, ms400, ms480, ms520, ms640, ms720,
                                                         ms840, ms1280, spare2, spare1 }      OPTIONAL, -
- Cond ServingCellWithoutPUCCH
    crossCarrierSchedulingConfig            CrossCarrierSchedulingConfig
OPTIONAL, -- Need M
    tag-Id                                  TAG-Id,
    dummy1                                  ENUMERATED {enabled}
OPTIONAL, -- Need R
    pathlossReferenceLinking                ENUMERATED {spCell, sCell}
OPTIONAL, -- Cond SCellOnly
    servingCellMO                           MeasObjectId
OPTIONAL, -- Cond MeasObject
    ...,
    ...
    [[
    additionalPCIList-r17::=                           SEQUENCE(SIZE (1..maxNrofAddionalPCI)) OF SSB-MTC-
AddionalPCI-r17          OPTIONAL, -- Need R
    unifiedtci-StateType-r17                           ENUMERATED {SeparateULDL, JointULDL},
OPTIONAL, -- Need R
    uplink-PowerControlToAddModList-r17 ::=            SEQUENCE (SIZE (1..maxULTCI-r17)) OF Uplink-
powerControl-r17               OPTIONAL -- Need R
    uplink-PowerControlToReleaseList-r17 ::=           SEQUENCE (SIZE (1..maxULTCI-r17)) OF Uplink-
powerControlId-r17            OPTIONAL -- Need R
    ]]
}
UplinkConfig ::=                            SEQUENCE {
    initialUplinkBWP                            BWP-UplinkDedicated
OPTIONAL, -- Need M
    uplinkBWP-ToReleaseList                     SEQUENCE (SIZE (1..maxNrofBWPs)) OF BWP-Id
OPTIONAL, Need N
    uplinkBWP-ToAddModList                      SEQUENCE (SIZE (1..maxNrofBWPs)) OF BWP-Uplink
OPTIONAL, -- Need N
    firstActiveUplinkBWP-Id                     BWP-Id
OPTIONAL, -- Cond SyncAndCellAdd
    pusch-ServingCellConfig                     SetupRelease { PUSCH-ServingCellConfig }
OPTIONAL, -- Need M
    carrierSwitching                            SetupRelease { SRS-CarrierSwitching }
OPTIONAL, -- Need M
    ...,
    [[
    powerBoostPi2BPSK                           BOOLEAN
OPTIONAL, -- Need M
    uplinkChannelBW-PerSCS-List                 SEQUENCE (SIZE (1..maxSCSs)) OF SCS-SpecificCarrier
OPTIONAL -- Need S
    ]],
    [[
    enablePL-RS-UpdateForPUSCH-SRS-r16     ENUMERATED {enabled}
OPTIONAL, -- Need R
    enableDefaultBeamPL-ForPUSCH0-0-r16    ENUMERATED {enabled}
OPTIONAL, -- Need R
    enableDefaultBeamPL-ForPUCCH-r16       ENUMERATED {enabled}
OPTIONAL, -- Need R
    enableDefaultBeamPL-ForSRS-r16         ENUMERATED {enabled}
OPTIONAL, -- Need R
```

-continued

| ServingCellConfig information element |
| --- |

| uplinkTxSwitching-r16 | SetupRelease { UplinkTxSwitching-r16 } |
| OPTIONAL, -- Need M | |
| mpr-PowerBoost-FR2-r16 | ENUMERATED {true} |
| OPTIONAL -- Need R | |
| ]] | |
| } | |
| } | |

| ServingCellConfig field descriptions |
| --- | additionalPCIList

List of timing information for the additional SSB with different PCI than serving cell PCI.

bwp-InactivityTimer

The duration in ms after which the UE falls back to the default Bandwidth Part (see TS 38.321 [3], clause 5.15). When the network releases the timer configuration, the UE stops the timer without switching to the default BWP.

defaultDownlinkBWP-Id

The initial bandwidth part is referred to by BWP-Id = 0. ID of the downlink bandwidth part to be used upon expiry of the BWP inactivity timer. This field is UE specific. When the field is absent the UE uses the initial BWP as default BWP. (see TS 38.213 [13], clause 12 and TS 38.321 [3], clause 5.15).

enableDefaultTCI-StatePerCoresetPoolIndex

Presence of this field indicates the UE shall follow the release 16 behavior of default TCI state per CORESETPoolindex when the UE is configured by higher layer parameter PDCCH-Config that contains two different values of CORESETPoolIndex in ControlResourceSet is enabled.

enableTwoDefaultTCI-States

Presence of this field indicates the UE shall follow the release 16 behavior of two default TCI states for PDSCH when at least one TCI codepoint is mapped to two TCI states is enabled firstActiveDownlinkBWP-Id If configured for an SpCell, this field contains the ID of the DL BWP to be activated upon performing the RRC (re-) configuration. If the field is absent, the RRC (re-)configuration does not impose a BWP switch.
If configured for an SCell, this field contains the ID of the downlink bandwidth part to be used upon activation of an SCell. The initial bandwidth part is referred to by BWP-Id = 0.
Upon reconfiguration with reconfigurationWithSync, the network sets the firstActiveDownlinkBWP-Id and firstActiveUplinkBWP-Id to the same value.

initialDownlinkBWP

The dedicated (UE-specific) configuration for the initial downlink bandwidth-part (i.e. DL BWP#0). If any of the optional IEs are configured within this IE, the UE considers the BWP#0 to be an RRC configured BWP (from UE capability viewpoint). Otherwise, the UE does not consider the BWP#0 as an RRC configured BWP (from UE capability viewpoint). Network always configures the UE with a value for this field if no other BWPs are configured. NOTE1 sCellDeactivationTimer

SCell deactivation timer in TS 38.321 [3]. If the field is absent, the UE applies the value infinity.

servingCellMO measObjectId of the MeasObjectNR in MeasConfig which is associated to the serving cell. For this MeasObjectNR, the following relationship applies between this MeasObjectNR and frequencyInfoDL in ServingCellConfigCommon of the serving cell: if ssbFrequency is configured, its value is the same as the absoluteFrequencySSB and if csi-rs-ResourceConfigMobility is configured, the value of its subcarrierSpacing is present in one entry of the scs-SpecificCarrierList, csi-RS-CellListMobility includes an entry corresponding to the serving cell (with cellId equal to physCellId in ServingCellConfigCommon) and the frequency range indicated by the csi-rs-MeasurementBW of the entry in csi-RS-CellListMobility is included in the frequency range indicated by in the entry of the scs-SpecificCarrierList.

supplementaryUplink

Network may configure this field only when supplementaryUplinkConfig is configured in ServingCellConfigCommon or supplementaryUplink is configured in ServingCellConfigCommonSIB.

supplementaryUplinkRelease

If this field is included, the UE shall release the uplink configuration configured by supplementaryUplink. The network only includes either supplementaryUplinkRelease or supplementaryUplink at a time.

tag-Id

Timing Advance Group ID, as specified in TS 38.321 [3], which this cell belongs to.

-continued

| ServingCellConfig field descriptions |
| --- |
| uplinkConfig |
| Network may configure this field only when uplinkConfigCommon is configured in ServingCellConfigCommon or ServingCellConfigCommonSIB. Addition or release of this field can only be done upon SCell addition or release (respectively). |

10

SSB-MTC

The IE SSB-MTC is used to configure measurement timing configurations, i.e., timing occasions at which the UE measures SSBs.

| SSB-MTC information element |
| --- |
| SSB-MTC ::=                      SEQUENCE {<br>　periodicityAndOffset                      CHOICE {<br>　　sf5                      INTEGER (0..4),<br>　　sf10                      INTEGER (0..9),<br>　　sf20                      INTEGER (0..19),<br>　　sf40                      INTEGER (0..39),<br>　　sf80                      INTEGER (0..79),<br>　　sf160                      INTEGER (0..159)<br>　},<br>　duration                      ENUMERATED { sf1, sf2, sf3, sf4, sf5 }<br>}<br>SSB-MTC2 ::=                      SEQUENCE {<br>　pci-List                      SEQUENCE (SIZE (1..maxNrofPCIsPerSMTC)) OF PhysCellId<br>OPTIONAL, -- Need M<br>　periodicity                      ENUMERATED {sf5, sf10, sf20, sf40, sf80, spare3, spare2,<br>spare1}<br>}<br>SSB-MTC2-LP-r16 ::=                      SEQUENCE {<br>　pci-List                      SEQUENCE (SIZE (1..maxNrofPCIsPerSMTC)) OF PhysCellId<br>OPTIONAL, -- Need R<br>　periodicity                      ENUMERATED {sf10, sf20, sf40, sf80, sf160, spare3, spare2,<br>spare1}<br>}<br>SSB-MTC3-r16 ::=                      SEQUENCE {<br>　periodicityAndOffset-r16                      CHOICE {<br>　　sf5-r16                      INTEGER (0..4),<br>　　sf10-r16                      INTEGER (0..9),<br>　　sf20-r16                      INTEGER (0..19),<br>　　sf40-r16                      INTEGER (0..39),<br>　　sf80-r16                      INTEGER (0..79),<br>　　sf160-r16                      INTEGER (0..159),<br>　　sf320-r16                      INTEGER (0..319),<br>　　sf640-r16                      INTEGER (0..639),<br>　　sf1280-r16                      INTEGER (0..1279)<br>　},<br>　duration-r16                      ENUMERATED {sf1, sf2, sf3, sf4, sf5},<br>　pci-List-r16                      SEQUENCE (SIZE (1..maxNrofPCIsPerSMTC)) OF PhysCellId<br>OPTIONAL, -- Need M<br>　ssb-ToMeasure-r16                      SetupRelease { SSB-ToMeasure }<br>OPTIONAL -- Need M<br>}<br>SSB-MTC-AdditionalPCI-r17 ::=                      SEQUENCE {<br>　additionalPCIIndex-r17                      AdditionalPCIIndex-r17,<br>　additionalPCI-r17                      PhysCellId,<br>　ssb-periodicity-r17                      ENUMERATED { ms5, ms10, ms20, ms40, ms80, ms160, spare2,<br>spare1 } OPTIONAL, -- Need S<br>　ssb-PositionsInBurst-r17                      CHOICE {<br>　　shortBitmap                      BIT STRING (SIZE (4)),<br>　　mediumBitmap                      BIT STRING (SIZE (8)),<br>　　longBitmap                      BIT STRING (SIZE (64))<br>　}<br>　ss-PBCH-BlockPower-r17                      INTEGER (−60..50),<br>-- Editor's note: more RAN1 input may be coming for this IE<br>AdditionalPCIIndex-r17 ::= INTEGER(0..maxNrofAddionalPCI-r17-1) |

| SSB-MTC-AdditionalPCI field descriptions |
| --- |
| additionalPCI |
| PCI of the additional SSB different from serving cell PCI |
| periodicity |
| Periodicity of the SS/PBCH blocks, see 5.5.2.10. Periodicity is given in number of subframes. |
| ssb-PositionsInBurst |
| Indicates the time domain positions of the transmitted SS-blocks in a half frame with SS/PBCH blocks as defined in TS 38.213 [13], clause 4.1. The first/leftmost bit corresponds to SS/PBCH block index 0, the second bit corresponds to SS/PBCH block index 1, and so on. Value 0 in the bitmap indicates that the corresponding SS/PBCH block is not transmitted while value 1 indicates that the corresponding SS/PBCH block is transmitted. |
| ss-PBCH-BlockPower |
| Average EPRE of the resources elements that carry secondary synchronization signals in dBm that the NW used for SSB transmission, see TS 38.213 [13], clause 7. |

CSI-SSB-ResourceSet

The IE CSI-SSB-ResourceSet is used to configure one SS/PBCH block resource set which refers to SS/PBCH as indicated in ServingCellConfigCommon.

| CSI-SSB-ResourceSet information element |
| --- |
| CSI-SSB-ResourceSet ::=        SEQUENCE {<br>    csi-SSB-ResourceSetId              CSI-SSB-ResourceSetId,<br>    csi-SSB-ResourceList              SEQUENCE (SIZE (1..maxNrofCSI-SSB-ResourcePerSet)) OF SSB-Index,<br>    ... ,<br>    [[<br>    additionalPCIList-r17              SEQUENCE (SIZE(1..maxNrofCSI-SSB-ResourcePerSet)) OF<br>AdditionalPCIIndex-r17          OPTIONAL -- Need R<br>    ]]<br>} |

| CSI-SSB-ResourceSet field descriptions | | TAG field descriptions |
| --- | --- | --- |
| additionalPCIList | | tag-Id |
| Indicates the physical cell IDs (PCI) of the SSBs in the csi-SSB-ResourceList. If present, the list has the same number of entries as csi-SSB-ResourceList | | Indicates the TAG of the SpCell or an SCell, see TS 38.321 [3]. Uniquely identifies the TAG within the scope of a Cell Group (i.e. MCG or SCG). |
| | | timeAlignmentTimer |
| | | Value in ms of the timeAlignmentTimer for TAG with ID tag-Id, as specified in TS 38.321 [3]. |

TAG-Config

The IE TAG-Config is used to configure parameters for a time-alignment group.

| TAG-Config information element |
| --- |
| TAG-Config ::=          SEQUENCE {<br>    tag-ToReleaseList              SEQUENCE (SIZE (1..maxNrofTAGs)) OF TAG-Id<br>OPTIONAL, -- Need N<br>    tag-ToAddModList              SEQUENCE (SIZE (1..maxNrofTAGs)) OF TAG<br>OPTIONAL -- Need N<br>}<br>TAG ::=          SEQUENCE {<br>    tag-Id              TAG-Id,<br>    timeAlignmentTimer              TimeAlignmentTimer,<br>    ...<br>}<br>TAG-Id ::=          INTEGER (0..maxNrofTAGs-1)<br>TimeAlignmentTimer ::=          ENUMERATED {ms500, ms750, ms1280, ms1920, ms2560, ms5120, ms10240, infinity} |

TCI-State

The IE TCI-State associates one or two DL reference signals with a corresponding quasi-colocation (QCL) type. If additionalPCI is configured for the reference signal, same value is configured for both DL reference signals.

---

| TCI-State information element |
| --- |

```
TCI-State ::=                        SEQUENCE {
    tci-StateId                          TCI-StateId,
    qcl-Type1                            QCL-Info,
    qcl-Type2                            QCL-Info
OPTIONAL, -- Need R
    ...
}
QCL-Info ::=                         SEQUENCE {
    cell                                 ServCellIndex
OPTIONAL, -- Need R
    bwp-Id                               BWP-Id
OPTIONAL, -- Cond CSI-RS-Indicated
    referenceSignal                      CHOICE {
        csi-rs                               NZP-CSI-RS-ResourceId,
        ssb                                  SSB-Index
    },
    qcl-Type                             ENUMERATED {typeA, typeB, typeC, typeD},
    ...,
    [[
    additionalPCI-r17                    AdditionalPCIIndex-r17
OPTIONAL -- Need R
    --Editor's note: Can be discussed if ASN1 overhead reasons should have another way to implement
than using this extension.
    --Editor's note: Needed in Rel-15/16 TCI state for mTRP intercell and in Rel-17 TCI state for BM
intercell
    ]]
}
DLorJoint-TCIState-r17 ::=           SEQUENCE {
    tci-StateUnifiedId-r17               TCI-StateId,
    qcl-Type1-r17                        QCL-Info-r17,
    qcl-Type2-r17                        QCL-Info-r17
OPTIONAL, -- Need R
    ul-powerControl-r17                  Uplink-powerControlId-r17
OPTIONAL, -- Need R
    pathlossReferenceRs-Id-r17           PUSCH-PathlossReferenceRS-Id -r17
OPTIONAL -- Need S
}
UL-TCIState-r17 ::=                  SEQUENCE {
    UL-TCIState-Id-r17                   UL-TCIState-Id-r17,
    servingCellId-r17                        ServCellIndex-r17        OPTIONAL, --
Need S
    referenceSignal-r17                      CHOICE {
        ssb-Index-r17                            SSB-Index-r17,
        csi-RS-Index-r17                         NZP-CSI-RS-ResourceId-r17,
        srs-r17                                  PUCCH-SRS-r17
    },
    additionalPCI-r17                    AdditionalPCIIndex-r17
OPTIONAL, -- Need R
    ul-powerControl-r17                  Uplink-powerControlId-r17
OPTIONAL, -- Need R
    pathlossReferenceRS-Id-r17           PUSCH-PathlossReferenceRS-Id-r17
OPTIONAL -- Need S
}
```

---

| QCL-Info field descriptions |
| --- |
| bwp-Id |
| The DL BWP which the RS is located in. |
| cell |
| The UE's serving cell in which the referenceSignal is configured. If the field is absent, it applies to the serving cell in which the TCI-State is configured. The RS can be located on a serving cell other than the serving cell in which the TCI-State is configured only if the qcl-Type is configured as typeC or typeD. See TS 38.214 [19] clause 5.1.5. |
| referenceSignal |
| Reference signal with which quasi-collocation information is provided as specified in TS 38.214 [19] subclause 5.1.5. |
| qcl-Type |

-continued

| QCL-Info field descriptions |
| --- |
| QCL type as specified in TS 38.214 [19] subclause 5.1.5. |

| Conditional Presence | Explanation |
| --- | --- |
| CSI-RS-Indicated | This field is mandatory present if csi-rs is included, absent otherwise |

TCI-StateId

The IE TCI-StateId is used to identify one TCI-State configuration.

| TCI-StateId information element |
| --- |
| TCI-StateId ::=     INTEGER (0..maxNrofTCI-States-1) |
| UL-TCIState-Id-r17  ::=  INTEGER (0..maxULTCI-r17-1) |

In 3GPP specification 38.321 (e.g., [3]3GPP specification 38.321 v16.7.0), random access procedure and timing advance/time alignment is introduced:

Timing Advance Group: A group of Serving Cells that is configured by RRC and that, for the cells with a UL configured, using the same timing reference cell and the same Timing Advance value. A Timing Advance Group containing the SpCell of a MAC entity is referred to as Primary Timing Advance Group (PTAG), whereas the term Secondary Timing Advance Group (STAG) refers to other TAGs.

5.1 Random Access Procedure 5.1.1 Random Access Procedure Initialization

The Random Access procedure described in this clause is initiated by a PDCCH order, by the MAC entity itself, or by RRC for the events in accordance with TS 38.300 [2]. There is only one Random Access procedure ongoing at any point in time in a MAC entity. The Random Access procedure on an SCell shall only be initiated by a PDCCH order with ra-PreambleIndex different from 0b000000.

[ . . . ]

When the Random Access procedure is initiated on a Serving Cell, the MAC entity shall:

1> flush the Msg3 buffer;

1> flush the MSGA buffer;

1> set the PREAMBLE_TRANSMISSION_COUNTER to 1;

1> set the PREAMBLE_POWER_RAMPING_COUNTER to 1;

1> set the PREAMBLE_BACKOFF to 0 ms;

1> set POWER_OFFSET_2STEP_RA to 0 dB;

1> if the carrier to use for the Random Access procedure is explicitly signalled:

2> select the signalled carrier for performing Random Access procedure;

2> set the PCMAX to $P_{CMAX,f,c}$ of the signalled carrier.

1> else if the carrier to use for the Random Access procedure is not explicitly signalled; and 1> if the Serving Cell for the Random Access procedure is configured with supplementary uplink as specified in TS 38.331 [5]; and 1> if the RSRP of the downlink pathloss reference is less than rsrp-ThresholdSSB-SUL:

2> select the SUL carrier for performing Random Access procedure;

2> set the PCMAX to $P_{CMAX,f,c}$ of the SUL carrier.

1> else:

2> select the NUL carrier for performing Random Access procedure;

2> set the PCMAX to $P_{CMAX,f,c}$ of the NUL carrier.

1> perform the BWP operation as specified in clause 5.15;

[ . . . ]

2> perform the Random Access Resource selection procedure (see clause 5.1.2).

5.1.2 Random Access Resource Selection

If the selected RA_TYPE is set to 4-stepRA, the MAC entity shall:

1> if the Random Access procedure was initiated for SpCell beam failure recovery (as specified in clause 5.17); and 1> if the beamFailureRecoveryTimer (in clause 5.17) is either running or not configured; and 1> if the contention-free Random Access Resources for beam failure recovery request associated with any of the SSBs and/or CSI-RSs have been explicitly provided by RRC; and 1> if at least one of the SSBs with SS-RSRP above rsrp-ThresholdSSB amongst the SSBs in candidate-BeamRSList or the CSI-RSs with CSI-RSRP above rsrp-ThresholdCSI-RS amongst the CSI-RSs in candidateBeamRSList is available:

2> select an SSB with SS-RSRP above rsrp-ThresholdSSB amongst the SSBs in candidateBeamRSList or a CSI-RS with CSI-RSRP above rsrp-ThresholdCSI-RS amongst the CSI-RSs in candidateBeamRSList;

2> if CSI-RS is selected, and there is no ra-PreambleIndex associated with the selected CSI-RS:

3> set the PREAMBLE_INDEX to a ra-PreambleIndex corresponding to the SSB in candidateBeamRSList which is quasi-colocated with the selected CSI-RS as specified in TS 38.214 [7].

2> else:

3> set the PREAMBLE_INDEX to a ra-PreambleIndex corresponding to the selected SSB or CSI-RS from the set of Random Access Preambles for beam failure recovery request.

1> else if the ra-PreambleIndex has been explicitly provided by PDCCH; and

1> if the ra-PreambleIndex is not 0b000000:

2> set the PREAMBLE_INDEX to the signalled ra-PreambleIndex;

2> select the SSB signalled by PDCCH.

1> else if the contention-free Random Access Resources associated with SSBs have been explicitly provided in rach-ConfigDedicated and at least one SSB with SS-RSRP above rsrp-ThresholdSSB amongst the associated SSBs is available:

2> select an SSB with SS-RSRP above rsrp-ThresholdSSB amongst the associated SSBs;

2> set the PREAMBLE_INDEX to a ra-PreambleIndex corresponding to the selected SSB.

1> else if the contention-free Random Access Resources associated with CSI-RSs have been explicitly provided in rach-ConfigDedicated and at least one CSI-RS with CSI-RSRP above rsrp-ThresholdCSI-RS amongst the associated CSI-RSs is available:

2> select a CSI-RS with CSI-RSRP above rsrp-ThresholdCSI-RS amongst the associated CSI-RSs;

2> set the PREAMBLE_INDEX to a ra-PreambleIndex corresponding to the selected CSI-RS.

1> else if the Random Access procedure was initiated for SI request (as specified in TS 38.331 [5]); and 1> if the Random Access Resources for SI request have been explicitly provided by RRC:

2> if at least one of the SSBs with SS-RSRP above rsrp-ThresholdSSB is available:

3> select an SSB with SS-RSRP above rsrp-ThresholdSSB.

2> else:

3> select any SSB.

2> select a Random Access Preamble corresponding to the selected SSB, from the Random Access Preamble(s) determined according to ra-PreambleStartIndex as specified in TS 38.331 [5];

2> set the PREAMBLE_INDEX to selected Random Access Preamble.

1> else (i.e. for the contention-based Random Access preamble selection):

2> if at least one of the SSBs with SS-RSRP above rsrp-ThresholdSSB is available:

3> select an SSB with SS-RSRP above rsrp-ThresholdSSB.

2> else:

3> select any SSB.

[ . . . ]

2> select a Random Access Preamble randomly with equal probability from the Random Access Preambles associated with the selected SSB and the selected Random Access Preambles group;

2> set the PREAMBLE_INDEX to the selected Random Access Preamble.

1> if the Random Access procedure was initiated for SI request (as specified in TS 38.331 [5]); and 1> if ra-AssociationPeriodIndex and si-RequestPeriod are configured:

2> determine the next available PRACH occasion from the PRACH occasions corresponding to the selected SSB in the association period given by ra-AssociationPeriodIndex in the si-RequestPeriod permitted by the restrictions given by the ra-ssb-OccasionMaskIndex if configured (the MAC entity shall select a PRACH occasion randomly with equal probability amongst the consecutive PRACH occasions according to clause 8.1 of TS 38.213 [6] corresponding to the selected SSB).

1> else if an SSB is selected above:

2> determine the next available PRACH occasion from the PRACH occasions corresponding to the selected SSB permitted by the restrictions given by the ra-ssb-OccasionMaskIndex if configured or indicated by PDCCH (the MAC entity shall select a PRACH occasion randomly with equal probability amongst the consecutive PRACH occasions according to clause 8.1 of TS 38.213 [6], corresponding to the selected SSB; the MAC entity may take into account the possible occurrence of measurement gaps when determining the next available PRACH occasion corresponding to the selected SSB).

1> else if a CSI-RS is selected above:

2> if there is no contention-free Random Access Resource associated with the selected CSI-RS:

3> determine the next available PRACH occasion from the PRACH occasions, permitted by the restrictions given by the ra-ssb-OccasionMaskIndex if configured, corresponding to the SSB in candidateBeamRSList which is quasi-colocated with the selected CSI-RS as specified in TS 38.214 [7](the MAC entity shall select a PRACH occasion randomly with equal probability amongst the consecutive PRACH occasions according to clause 8.1 of TS 38.213 [6], corresponding to the SSB which is quasi-colocated with the selected CSI-RS; the MAC entity may take into account the possible occurrence of measurement gaps when determining the next available PRACH occasion corresponding to the SSB which is quasi-colocated with the selected CSI-RS).

2> else:

3> determine the next available PRACH occasion from the PRACH occasions in ra-OccasionList corresponding to the selected CSI-RS (the MAC entity shall select a PRACH occasion randomly with equal probability amongst the PRACH occasions occurring simultaneously but on different subcarriers, corresponding to the selected CSI-RS; the MAC entity may take into account the possible occurrence of measurement gaps when determining the next available PRACH occasion corresponding to the selected CSI-RS).

1> perform the Random Access Preamble transmission procedure (see clause 5.1.3).

5.1.3 Random Access Preamble Transmission

The MAC entity shall, for each Random Access Preamble:

1> if PREAMBLE_TRANSMISSION_COUNTER is greater than one; and

1> if the notification of suspending power ramping counter has not been received from lower layers; and 1> if LBT failure indication was not received from lower layers for the last Random Access Preamble transmission; and 1> if SSB or CSI-RS selected is not changed from the selection in the last Random Access Preamble transmission:

2> increment PREAMBLE_POWER_RAMPING_COUNTER by 1.

1> select the value of DELTA_PREAMBLE according to clause 7.3; 1> set PREAMBLE_RECEIVED_TARGET_POWER to preambleReceivedTargetPower+DELTA_PREAMBLE+(PREAMBLE_POWER_RAMPING_COUNTER−1)×PREAMBLE_POWER_RAMPING_STEP+POWER_OFFSET_2STEP_RA;

1> except for contention-free Random Access Preamble for beam failure recovery request, compute the RA-RNTI associated with the PRACH occasion in which the Random Access Preamble is transmitted;

1> instruct the physical layer to transmit the Random Access Preamble using the selected PRACH occasion, corresponding RA-RNTI (if available), PREAMBLE_INDEX, and PREAMBLE_RECEIVED_TARGET_POWER.

1> if LBT failure indication is received from lower layers for this Random Access Preamble transmission:

2> if lbt-FailureRecoveryConfig is configured:

3> perform the Random Access Resource selection procedure (see clause 5.1.2).

2> else:

3> increment PREAMBLE_TRANSMISSION_COUNTER by 1;

3> if PREAMBLE_TRANSMISSION_
COUNTER=preambleTransMax+1:

4> if the Random Access Preamble is transmitted on the SpCell:

5> indicate a Random Access problem to upper layers;

5> if this Random Access procedure was triggered for SI request:

6> consider the Random Access procedure unsuccessfully completed.

4> else if the Random Access Preamble is transmitted on an SCell:

5> consider the Random Access procedure unsuccessfully completed.

3> if the Random Access procedure is not completed:

4> perform the Random Access Resource selection procedure (see clause 5.1.2).

5.1.4 Random Access Response Reception

Once the Random Access Preamble is transmitted and regardless of the possible occurrence of a measurement gap, the MAC entity shall:

1> if the contention-free Random Access Preamble for beam failure recovery request was transmitted by the MAC entity:

2> start the ra-ResponseWindow configured in BeamFailureRecoveryConfig at the first PDCCH occasion as specified in TS 38.213 [6] from the end of the Random Access Preamble transmission;

2> monitor for a PDCCH transmission on the search space indicated by recoverySearchSpaceId of the SpCell identified by the C-RNTI while ra-Response-Window is running.

1> else:

2> start the ra-ResponseWindow configured in RACH-ConfigCommon at the first PDCCH occasion as specified in TS 38.213 [6] from the end of the Random Access Preamble transmission;

2> monitor the PDCCH of the SpCell for Random Access Response(s) identified by the RA-RNTI while the ra-ResponseWindow is running.

1> if notification of a reception of a PDCCH transmission on the search space indicated by recoverySearchSpaceId is received from lower layers on the Serving Cell where the preamble was transmitted; and 1> if PDCCH transmission is addressed to the C-RNTI; and 1> if the contention-free Random Access Preamble for beam failure recovery request was transmitted by the MAC entity:

2> consider the Random Access procedure successfully completed.

1> else if a valid (as specified in TS 38.213 [6]) downlink assignment has been received on the PDCCH for the RA-RNTI and the received TB is successfully decoded:

2> if the Random Access Response contains a MAC subPDU with Backoff Indicator:

3> set the PREAMBLE_BACKOFF to value of the BI field of the MAC subPDU using Table 7.2-1, multiplied with SCALING_FACTOR_BI.

2> else:

3> set the PREAMBLE_BACKOFF to 0 ms.

2> if the Random Access Response contains a MAC subPDU with Random Access Preamble identifier corresponding to the transmitted PREAMBLE_INDEX (see clause 5.1.3):

3> consider this Random Access Response reception successful.

2> if the Random Access Response reception is considered successful:

3> if the Random Access Response includes a MAC subPDU with RAPID only:

4> consider this Random Access procedure successfully completed;

4> indicate the reception of an acknowledgement for SI request to upper layers.

3> else:

4> apply the following actions for the Serving Cell where the Random Access Preamble was transmitted:

5> process the received Timing Advance Command (see clause 5.2);

5> indicate the preambleReceivedTargetPower and the amount of power ramping applied to the latest Random Access Preamble transmission to lower layers (i.e. (PREAMBLE_POWER_RAMPING_COUNTER−1)× PREAMBLE_POWER_RAMPING_STEP);

5> if the Random Access procedure for an SCell is performed on uplink carrier where pusch-Config is not configured:

6> ignore the received UL grant.

5> else:

6> process the received UL grant value and indicate it to the lower layers.

4> if the Random Access Preamble was not selected by the MAC entity among the contention-based Random Access Preamble(s):

5> consider the Random Access procedure successfully completed.

4> else:

5> set the TEMPORARY_C-RNTI to the value received in the Random Access Response;

5> if this is the first successfully received Random Access Response within this Random Access procedure:

6> if the transmission is not being made for the CCCH logical channel:

7> indicate to the Multiplexing and assembly entity to include a C-RNTI MAC CE in the subsequent uplink transmission.

6> if the Random Access procedure was initiated for SpCell beam failure recovery and spCell-BFR-CBRA with value true is configured:

7> indicate to the Multiplexing and assembly entity to include a BFR MAC CE or a Truncated BFR MAC CE in the subsequent uplink transmission.

6> obtain the MAC PDU to transmit from the Multiplexing and assembly entity and store it in the Msg3 buffer.

5.1.5 Contention Resolution

Once Msg3 is transmitted the MAC entity shall:

1> start the ra-ContentionResolution Timer and restart the ra-ContentionResolutionTimer at each HARQ retransmission in the first symbol after the end of the Msg3 transmission;

1> monitor the PDCCH while the ra-ContentionResolutionTimer is running regardless of the possible occurrence of a measurement gap;

1> if notification of a reception of a PDCCH transmission of the SpCell is received from lower layers:

2> if the C-RNTI MAC CE was included in Msg3:

3> if the Random Access procedure was initiated for SpCell beam failure recovery (as specified in clause 5.17) and the PDCCH transmission is addressed to the C-RNTI; or 3> if the Random Access procedure was initiated by a PDCCH order and the PDCCH transmission is addressed to the C-RNTI; or 3> if the Random Access procedure was initiated by the MAC sublayer itself or by the RRC sublayer and the PDCCH transmission is addressed to the C-RNTI and contains a UL grant for a new transmission:

4> consider this Contention Resolution successful;

4> stop ra-ContentionResolutionTimer;

4> discard the TEMPORARY C-RNTI;

4> consider this Random Access procedure successfully completed.

2> else if the CCCH SDU was included in Msg3 and the PDCCH transmission is addressed to its TEMPO-RARY_C-RNTI:

3> if the MAC PDU is successfully decoded:

4> stop ra-ContentionResolutionTimer;

4> if the MAC PDU contains a UE Contention Resolution Identity MAC CE; and

4> if the UE Contention Resolution Identity in the MAC CE matches the CCCH SDU transmitted in Msg3:

5> consider this Contention Resolution successful and finish the disassembly and demultiplexing of the MAC PDU;

5> if this Random Access procedure was initiated for SI request:

6> indicate the reception of an acknowledgement for SI request to upper layers.

5> else:

6> set the C-RNTI to the value of the TEMPORARY_C-RNTI;

5> discard the TEMPORARY_C-RNTI;

5> consider this Random Access procedure successfully completed.

4> else:

5> discard the TEMPORARY_C-RNTI;

5> consider this Contention Resolution not successful and discard the successfully decoded MAC PDU.

5.1.6 Completion of the Random Access Procedure

Upon completion of the Random Access procedure, the MAC entity shall:

1> discard any explicitly signalled contention-free Random Access Resources for 2-step RA type and 4-step RA type except the 4-step RA type contention-free Random Access Resources for beam failure recovery request, if any;

1> flush the HARQ buffer used for transmission of the MAC PDU in the Msg3 buffer and the MSGA buffer.

5.2 Maintenance of Uplink Time Alignment

RRC configures the following parameters for the maintenance of UL time alignment:

timeAlignmentTimer (per TAG) which controls how long the MAC entity considers the Serving Cells belonging to the associated TAG to be uplink time aligned.

The MAC entity shall:

1> when a Timing Advance Command MAC CE is received, and if an $N_{TA}$ (as defined in TS 38.211 [8]) has been maintained with the indicated TAG:

2> apply the Timing Advance Command for the indicated TAG;

2> start or restart the timeAlignmentTimer associated with the indicated TAG.

1> when a Timing Advance Command is received in a Random Access Response message for a Serving Cell belonging to a TAG or in a MSGB for an SpCell:

2> if the Random Access Preamble was not selected by the MAC entity among the contention-based Random Access Preamble:

3> apply the Timing Advance Command for this TAG;

3> start or restart the timeAlignmentTimer associated with this TAG.

2> else if the timeAlignmentTimer associated with this TAG is not running:

3> apply the Timing Advance Command for this TAG;

3> start the timeAlignmentTimer associated with this TAG;

3> when the Contention Resolution is considered not successful as described in clause 5.1.5; or 3> when the Contention Resolution is considered successful for SI request as described in clause 5.1.5, after transmitting HARQ feedback for MAC PDU including UE Contention Resolution Identity MAC CE:

4> stop timeAlignmentTimer associated with this TAG.

2> else:

3> ignore the received Timing Advance Command.

1> when an Absolute Timing Advance Command is received in response to a MSGA transmission including C-RNTI MAC CE as specified in clause 5.1.4a:

2> apply the Timing Advance Command for PTAG;

2> start or restart the timeAlignmentTimer associated with PTAG.

1> when a timeAlignmentTimer expires:

2> if the timeAlignmentTimer is associated with the PTAG:

3> flush all HARQ buffers for all Serving Cells;

3> notify RRC to release PUCCH for all Serving Cells, if configured;

3> notify RRC to release SRS for all Serving Cells, if configured;

3> clear any configured downlink assignments and configured uplink grants;

3> clear any PUSCH resource for semi-persistent CSI reporting;

3> consider all running timeAlignmentTimers as expired;

3> maintain $N_{TA}$ (defined in TS 38.211 [8]) of all TAGs.

2> else if the timeAlignmentTimer is associated with an STAG, then for all Serving Cells belonging to this TAG:

3> flush all HARQ buffers;

3> notify RRC to release PUCCH, if configured;

3> notify RRC to release SRS, if configured;

3> clear any configured downlink assignments and configured uplink grants;

3> clear any PUSCH resource for semi-persistent CSI reporting;

3> maintain $N_{TA}$ (defined in TS 38.211 [8]) of this TAG.

When the MAC entity stops uplink transmissions for an SCell due to the fact that the maximum uplink transmission timing difference between TAGs of the MAC entity or the maximum uplink transmission timing difference between TAGs of any MAC entity of the UE is exceeded, the MAC entity considers the timeAlignmentTimer associated with the SCell as expired.

The MAC entity shall not perform any uplink transmission on a Serving Cell except the Random Access Preamble and MSGA transmission when the timeAlignmentTimer associated with the TAG to which this Serving Cell belongs is not running. Furthermore, when the timeAlignmentTimer associated with the PTAG is not running, the MAC entity shall not perform any uplink transmission on any Serving Cell except the Random Access Preamble and MSGA transmission on the SpCell.

5.9 Activation/Deactivation of SCells

If the MAC entity is configured with one or more SCells, the network may activate and deactivate the configured SCells. Upon configuration of an SCell, the SCell is deactivated unless the parameter sCellState is set to activated for the SCell by upper layers.

The configured SCell(s) is activated and deactivated by:

receiving the SCell Activation/Deactivation MAC CE described in clause 6.1.3.10;

configuring sCellDeactivationTimer timer per configured SCell (except the SCell configured with PUCCH, if any): the associated SCell is deactivated upon its expiry;

configuring sCellState per configured SCell: if configured, the associated SCell is activated upon SCell configuration.

The MAC entity shall for each configured SCell:

1> if an SCell is configured with sCellState set to activated upon SCell configuration, or an SCell Activation/Deactivation MAC CE is received activating the SCell:

2> if the SCell was deactivated prior to receiving this SCell Activation/Deactivation MAC CE; or 2> if the SCell is configured with sCellState set to activated upon SCell configuration:

3> if firstActiveDownlinkBWP-Id is not set to dormant BWP:

4> activate the SCell according to the timing defined in TS 38.213 [6] for MAC CE activation and according to the timing defined in TS 38.133 [11] for direct SCell activation; i.e. apply normal SCell operation including:

5> SRS transmissions on the SCell;

5> CSI reporting for the SCell;

5> PDCCH monitoring on the SCell;

5> PDCCH monitoring for the SCell;

5> PUCCH transmissions on the SCell, if configured.

3> else (i.e. firstActiveDownlinkBWP-Id is set to dormant BWP):

4> stop the bwp-InactivityTimer of this Serving Cell, if running.

3> activate the DL BWP and UL BWP indicated by firstActiveDownlinkBWP-Id and firstActiveUplinkBWP-Id respectively.

2> start or restart the sCellDeactivationTimer associated with the SCell according to the timing defined in TS 38.213 [6] for MAC CE activation and according to the timing defined in TS 38.133 [11] for direct SCell activation;

2> if the active DL BWP is not the dormant BWP:

3> (re-)initialize any suspended configured uplink grants of configured grant Type 1 associated with this SCell according to the stored configuration, if any, and to start in the symbol according to rules in clause 5.8.2;

3> trigger PHR according to clause 5.4.6.

1> else if an SCell Activation/Deactivation MAC CE is received deactivating the SCell; or 1> if the sCellDeactivationTimer associated with the activated SCell expires:

2> deactivate the SCell according to the timing defined in TS 38.213 [6];

2> stop the sCellDeactivationTimer associated with the SCell;

2> stop the bwp-InactivityTimer associated with the SCell;

2> deactivate any active BWP associated with the SCell;

2> clear any configured downlink assignment and any configured uplink grant Type 2 associated with the SCell respectively;

2> clear any PUSCH resource for semi-persistent CSI reporting associated with the SCell;

2> suspend any configured uplink grant Type 1 associated with the SCell;

2> flush all HARQ buffers associated with the SCell;

2> cancel, if any, triggered consistent LBT failure for the SCell.

1> if PDCCH on the activated SCell indicates an uplink grant or downlink assignment; or 1> if PDCCH on the Serving Cell scheduling the activated SCell indicates an uplink grant or a downlink assignment for the activated SCell; or 1> if a MAC PDU is transmitted in a configured uplink grant and LBT failure indication is not received from lower layers; or 1> if a MAC PDU is received in a configured downlink assignment:

2> restart the sCellDeactivationTimer associated with the SCell.

1> if the SCell is deactivated:

2> not transmit SRS on the SCell;

2> not report CSI for the SCell;

2> not transmit on UL-SCH on the SCell;

2> not transmit on RACH on the SCell;

2> not monitor the PDCCH on the SCell;

2> not monitor the PDCCH for the SCell;

2> not transmit PUCCH on the SCell.

HARQ feedback for the MAC PDU containing SCell Activation/Deactivation MAC CE shall not be impacted by PCell, PSCell and PUCCH SCell interruptions due to SCell activation/deactivation in TS 38.133 [11].

When SCell is deactivated, the ongoing Random Access procedure on the SCell, if any, is aborted.

5.18.4 Activation/Deactivation of UE-Specific PDSCH TCI State

The network may activate and deactivate the configured TCI states for PDSCH of a Serving Cell or a set of Serving Cells configured in simultaneousTCI-UpdateList1 or simultaneousTCI-UpdateList2 by sending the TCI States Activation/Deactivation for UE-specific PDSCH MAC CE described in clause 6.1.3.14. The network may activate and deactivate the configured TCI states for a codepoint of the DCI Transmission configuration indication field as specified in TS 38.212 [9] for PDSCH of a Serving Cell by sending the Enhanced TCI States Activation/Deactivation for UE-specific PDSCH MAC CE described in clause 6.1.3.24. The configured TCI states for PDSCH are initially deactivated upon configuration and after a handover.

The MAC entity shall:

1> if the MAC entity receives a TCI States Activation/Deactivation for UE-specific PDSCH MAC CE on a Serving Cell:

2> indicate to lower layers the information regarding the TCI States Activation/Deactivation for UE-specific PDSCH MAC CE.

1> if the MAC entity receives an Enhanced TCI States Activation/Deactivation for UE-specific PDSCH MAC CE on a Serving Cell:

2> indicate to lower layers the information regarding the Enhanced TCI States Activation/Deactivation for UE-specific PDSCH MAC CE.

5.18.5 Indication of TCI State for UE-Specific PDCCH

The network may indicate a TCI state for PDCCH reception for a CORESET of a Serving Cell or a set of Serving Cells configured in simultaneousTCI-UpdateList1 or simultaneousTCI-UpdateList2 by sending the TCI State Indication for UE-specific PDCCH MAC CE described in clause 6.1.3.15.

The MAC entity shall:

1> if the MAC entity receives a TCI State Indication for UE-specific PDCCH MAC CE on a Serving Cell:

2> indicate to lower layers the information regarding the TCI State Indication for UE-specific PDCCH MAC CE.

In WID MIMO evolution (e.g., [4] RP-213598 Work Item Description: MIMO Evolution for Downlink and Uplink), Rel-18 MIMO enhancements are discussed:

3 Justification

MIMO is one of the key technologies in NR systems and is successful in commercial deployment. In Rel-15/16/17, MIMO features were investigated and specified for both FDD and TDD systems, of which major parts were for downlink MIMO operation. In Rel-18, it is important to identify and specify necessary enhancements for uplink MIMO, while necessary enhancements on downlink MIMO that facilitate the use of large antenna array, not only for FRI but also for FR2, would still need to be introduced to fulfil the request for evolution of NR deployments. This comprises the following areas of enhancement.

First, significant loss of performance for a UE at high/medium speed has been observed in commercial deployments especially in multi-user MIMO (MU-MIMO) scenarios. As the performance loss is partly caused by outdated CSI, enhancements on CSI acquisition to alleviate such loss can be beneficial. Second, the unified TCI framework was introduced in Rel-17 which facilitates streamlined multi-beam operation targeting FR2. As Rel-17 focuses on single-TRP use cases, extension of unified TCI framework that focuses on multi-TRP use cases is beneficial. Third, due to the increasing need for multiplexing capacity of downlink and uplink demodulation reference signal (DMRS) from various use cases, there is a need for increasing the number of orthogonal ports for DMRS. Fourth, features for facilitating multi-TRP deployments have been introduced in Rel-16/17 focusing on non-coherent joint transmission (NC-JT). As coherent joint transmission (CJT) improves coverage and average throughput in commercial deployments with high-performance backhaul and synchronization, enhancement on CSI acquisition for FDD and TDD, targeting FRI, can be beneficial in expanding the utility of multi-TRP deployments. Fifth, as advanced UEs (e.g. CPE, FWA, vehicle, industrial devices) become more relevant, introducing necessary enhancements to support for 8 antenna ports as well as 4 and more layers for UL transmission can offer the needed improvement for UL coverage and average throughput. Sixth, with the introduction of features for UL panel selection in Rel-17, advanced UEs (e.g. CPE, FWA, vehicle, industrial devices) can benefit from higher UL coverage and average throughput with simultaneous UL multi-panel transmission. Finally, some further enhancement to facilitate UL multi-TRP deployments via two timing advances (TAs) and enhanced UL power control can offer additional UL performance improvement.

4 Objective 4.1 Objective of SI or Core Part WI or Testing Part WI

The detailed objectives are as follows:

RAN1:

[ . . . ]

. . .

1. Study, and if justified, specify the following

Two TAs for UL multi-DCI for multi-TRP operation

Power control for UL single DCI for multi-TRP operation where unified TCI framework extension in objective 2 is assumed.

For the case of simultaneous UL transmission from multiple panels, the operation will only be limited to the objective 6 scenarios.

In 3GPP specification 38.211 (e.g., [6]3GPP specification 38.211 v17.1.0), timing advance is introduced:

$N_{TA}$ Timing advance between downlink and uplink; see clause 4.3.1

$N_{TA,offset}$ A fixed offset used to calculate the timing advance; see clause 4.3.1

4.3.1 Frames and Subframes

Downlink, uplink, and sidelink transmissions are organized into frames with $T_f = (\Delta f_{max} N_f / 100) \cdot T_c = 10$ ms duration, each consisting of ten subframes of $T_{sf} = (\Delta f_{max} N_f / 1000) \cdot T_c = 1$ ms duration. The number of consecutive OFDM symbols per subframe is $N_{symb}^{subframe,\mu} = N_{symb}^{slot} N_{slot}^{subframe,\mu}$. Each frame is divided into two equally-sized half-frames of five subframes each with half-frame 0 consisting of subframes 0-4 and half-frame 1 consisting of subframes 5-9.

There is one set of frames in the uplink and one set of frames in the downlink on a carrier.

Uplink frame number i for transmission from the UE shall start $T_{TA} = (N_{TA} + N_{TA,offset} + N_{TA,adj}^{common} + N_{TA,adj}^{UE}) T_c$ before the start of the corresponding downlink frame at the UE where $N_{TA}$ and $N_{TA,offset}$ are given by clause 4.2 of [5, TS 38.213], except for msgA transmission on PUSCH where $N_{TA} = 0$ shall be used;

$N_{TA,adj}^{common}$ is derived from the higher-layer parameters TACommon, TACommonDrift, and TACommonDrift-Variation if configured, otherwise $N_{TA,adj}^{common} = 0$;

$N_{TA,adj}^{UE}$ is computed by the UE based on UE position and serving-satellite-ephemeris-related higher-layers parameters if configured, otherwise $N_{TA,adj}^{UE} = 0$.

Figure 5:
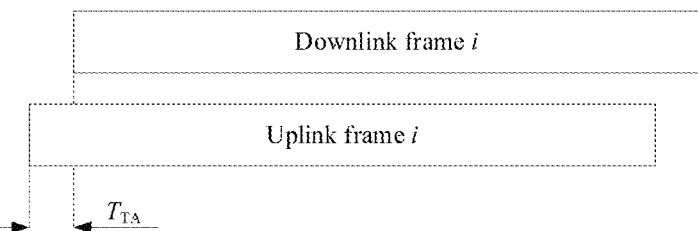
FIG. 5 is a reproduction of FIG. 4.3.1-1: Uplink-downlink timing relation, from RP-213598 Work Item Description: MIMO Evolution for Downlink and Uplink.

FIG. 5 is a Reproduction of FIG. 4.3.1-1: Uplink-Downlink Timing Relation, from RP-213598 Work Item Description: MIMO Evolution for Downlink and Uplink.

In New Radio ($N_R$), a User Equipment (UE) performs a handover procedure to switch from one cell (e.g., a source Cell) to another cell (e.g., a target Cell). The UE performs the handover procedure in response to a Radio Resource Control (RRC) signaling transmitted by a network. The RRC signaling contains cell information of a target cell. The network determines to initiate the handover procedure based on measurement reports of the UE. Change of Primary Cell (PCell) and Primary and Secondary Cell (PSCell) via reconfiguration with sync (e.g., involving Layer-3 RRC message) involves high latency and more overhead than L1/L2 signaling (e.g., beam switch mobility). In addition, in operation on FR2, frequent Secondary Cell Group (SCG) changes will occur, which could also lead to high latency for UE-Network (NW) communication if L3 Handover is used. Therefore, in Work Item Description (WID) for NR mobility enhancements (e.g., [1] RP-212710 NR further mobility enhancements), an objective of the work item is to specify mechanism and procedure (e.g., a L1/L2 mobility procedure, or mobility procedure) for dynamic switching mechanism among serving cells, including Special Cell (SpCell) and/or Secondary Cell(s) (SCell) based on L1/L2 signaling. The serving cells could include a target Cell of the mobility procedure and one or more Secondary Cell(s) (to be added or released) in the mobility procedure. A mobility procedure could consist of gNB of source Cell providing a first information and a second information. The first information could contain or indicate candidate cell information (via a RRC message). The second information may not be a RRC or L3 message, and could indicate the UE to perform mobility procedure to one or more Cell(s). The one or more Cell(s) could be target Cell(s) of the mobility procedure.

A mobility procedure of a UE could comprise a UE obtaining a time alignment (TA) information associated with the target Cell(s). The target Cell(s) could comprise PCell and/or SCell(s) the UE switches to after completion of the mobility procedure. The UE could consider the target Cell(s) as PCell and/or SCell(s) after/in response to initiation or completion of the mobility procedure. The UE could perform a random access procedure to obtain (Uplink (UL)) TA information (e.g., a timing advance value, or $N_{TA}$) associated with the target Cell(s) (e.g., target SpCell and/or SCells). Additionally and/or alternatively, a gNB (associated with the source Cell or the target Cell) could provide TA information associated with the target Cell(s).

The mobility procedure of the UE could comprise a UE (de)activating beam(s) associated with the target Cell(s). The mobility procedure could comprise the UE resetting a Medium Access Control (MAC) (entity) of the UE (associated with gNB of the source Cell or the target Cell(s)).

Figure 6:
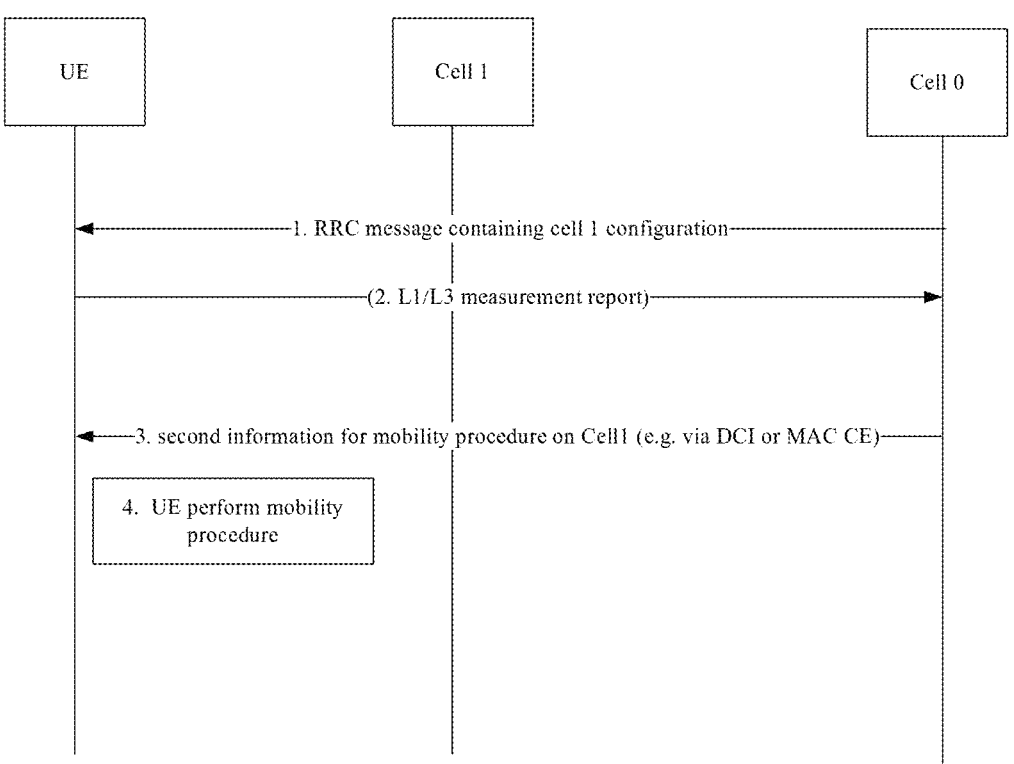
FIG. 6 is a diagram example of a UE receiving a first information containing cell 1 configuration from cell 0, in accordance with embodiments of the present invention.

An example is shown in FIG. 6. The UE receives a first information (e.g., step 1 RRC message) containing cell 1 configuration from Cell 0. The UE could perform RRC connection with Cell 0. The Cell 1 configuration could contain Serving Cell configuration of Cell1. The Cell 1 could be a neighbor cell, a Secondary Cell, or a Primary Cell of the UE. The UE could transmit a L1/L3 measurement report to Cell 0 (including measurement associated with Cell1). The Cell 0 could transmit a second information (e.g., step 3 Downlink Control Information (DCI) or Medium Access Control (MAC) Control Element (CE)) to the UE for initiating a mobility procedure associated with Cell 1. In response to receiving the second information, the UE could initiate or perform a mobility procedure associated with Cell 1. Corresponding to various setup for the information and procedure, the UE could perform various procedures to Cell 1 (e.g., SCell addition/release; PCell switching, etc). The UE could consider the Cell 1 as a (activated) PCell or a SCell (in Master Cell Group (MCG) or Secondary Cell Group (SCG)) in response to completion of the mobility procedure (or in response to receiving the second information).

The second information could indicate one or more Cell(s) or Cell Group(s) (CG(s)) that needs to be changed (added/activated/removed/released). The second information could indicate a target Cell for the UE to switch its Special Cell to. In response to or when receiving a second information, the UE could be able to know the target one or more Cell(s) or CG(s) and/or its target Cell for mobility procedure. Additionally and/or alternatively, in response to the second information, the UE could be able to know which beam(s) to use for transmission/reception with the one or more Cell(s) or CG(s) (during completion of a mobility procedure). The UE could transmit an (positive) acknowledgement (e.g., a Medium Access Control (MAC) Control Element (CE)) to the source Cell in response to receiving the second information. The Source Cell and/or the first/second information may not provide UL resource(s) or UL grant for the UE to perform transmission to the target Cell.

The mobility procedure could comprise one or more of following action(s) (and may not comprise one or more of following other action(s)).

The UE could initiate a random access procedure to a Cell in the one or more Cell(s) or CG(s). The Cell could be a target Cell of the mobility procedure. The UE could consider the mobility procedure to be completed in response to (successful) completion of the random access procedure. The UE could consider the Cell to be a PCell or a SpCell in response to completion of the random access procedure and/or completion of the mobility procedure.

The UE could transmit a mobility completion message to a Cell in the one or more Cell(s) or CG(s). The Cell could be a target Cell of the mobility procedure. The UE could transmit the mobility completion message to the Cell via a UL grant provided/scheduled by a Source Cell or via a gNB associated with the Source Cell. Additionally and/or alternatively, the UE could transmit the mobility completion message to the Cell via a UL grant provided/scheduled by the (target) Cell or by a gNB associated with the (target) Cell.

The UE could receive an acknowledgement from a Cell in the one or more Cell(s) or CG(s). The Cell could be a target Cell of the mobility procedure. The acknowledgement could be a signaling associated with the mobility completion message. The acknowledgement could be a signaling associated with completion of the mobility procedure.

Figure 7:
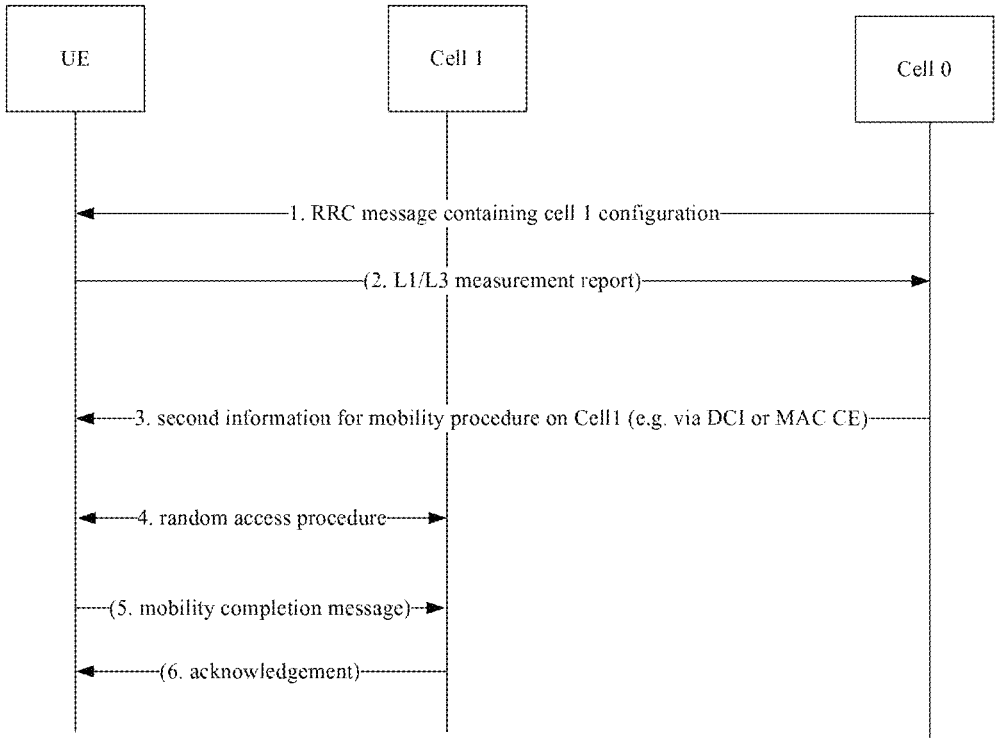
FIG. 7 is a diagram example of a UE configured/activated with a Serving Cell Cell 0, in accordance with embodiments of the present invention.

An example is shown in FIG. 7. The UE could be configured/activated with a Serving Cell Cell 0 (e.g., a SpCell or a Secondary Cell). The UE could receive a RRC message (e.g., first information above) indicating configuration of Cell 1. The UE could (optionally) perform measurement on Cell 1 and transmit measurement report of Cell 1 to the network of Cell 0. The network (e.g., gNB) of Cell 0 could transmit a second information (e.g., based on measurement report from the UE) for the UE to initiate a mobility procedure to Cell 1. The mobility procedure comprises initiating a random access procedure to Cell 1. The mobility procedure could (or may not) comprise the UE transmitting a mobility completion message to the Cell 1. The mobility procedure could (or may not) comprise the Cell 1 transmitting an acknowledgement to the UE. The UE could consider the mobility procedure to be completed in response to (successful) completion of random access procedure. Additionally and/or alternatively, the UE could consider the mobility procedure to be completed in response to receiving the acknowledgement. The mobility completion message could be transmitted during the random access procedure (e.g., transmitted via Msg3) or could be transmitted independent of or after the random access procedure. The acknowledgement could be transmitted during the random access procedure (e.g., transmitted via Msg4 or Msg2) or could be transmitted independent of or after the random access procedure.

Figure 8:
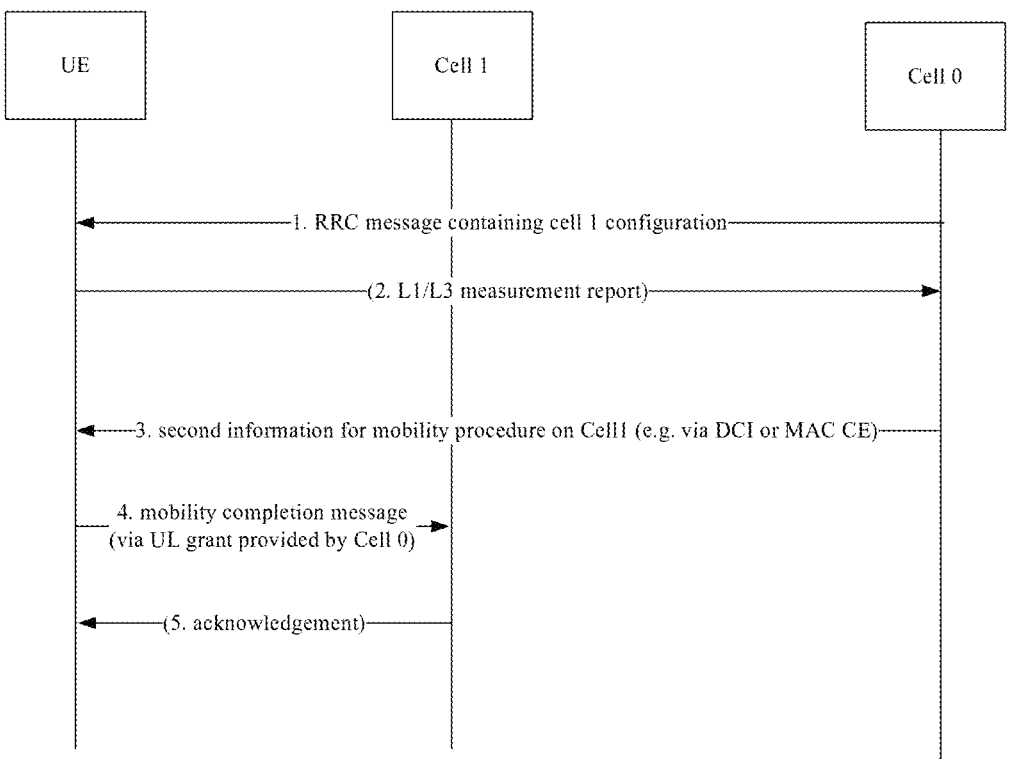
FIG. 8 is a diagram example of a UE initiating/performing a mobility procedure to Cell 1 in response to receiving a second information for mobility procedure, in accordance with embodiments of the present invention.

Another example is shown in FIG. 8. In response to receiving a second information for mobility procedure, the UE initiates/performs a mobility procedure to Cell 1. The UE may not initiate a random access procedure for the mobility procedure. The mobility procedure does not contain a random access procedure. The mobility procedure could contain the UE transmit a mobility completion message to Cell 1 via a UL grant. The UL grant could be scheduled by network associated with Cell 0 (source Cell). The UL grant could be provided/configured in the first information. Additionally and/or alternatively, the UL grant could be provided/indicated in the second information. Additionally and/or alternatively, the UL grant could be configured by the first information and activated by the second information.

Figures 9, 9A:
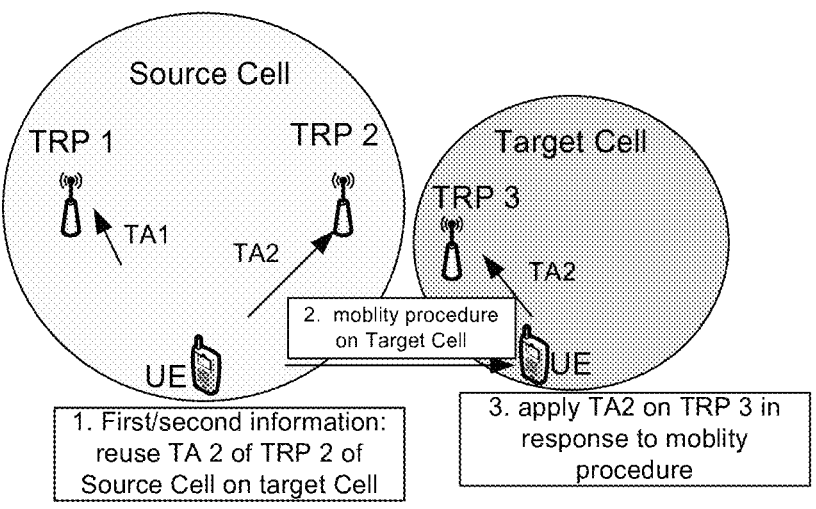
FIG. 9 is a diagram example of a network associated with Cell 1 providing or scheduling a UL grant to the UE during or before the mobility procedure indicated by second information from network of the Cell 0, in accordance with embodiments of the present invention.
FIG. 9A is a diagram example of an association or mapping indicating a TA information, in accordance with embodiments of the present invention.

Another example is shown in FIG. 9. A network associated with the Cell 1 could provide or schedule a UL grant to the UE during or before the mobility procedure indicated by second information from network of the Cell 0. The UE could transmit a mobility completion message to the Cell 1.

The UE could consider the mobility procedure to be completed when transmitting the mobility completion message or when receiving an acknowledgement of the mobility completion message from Cell 1. The second information could indicate beam information (e.g., Transmission Configuration Indication (TCI) state information such as TCI states id or spatial relation info) associated with target Cell (e.g., Cell 1) to the UE. The UE could activate (Downlink (DL)) TCI states or beams associated with the Cell 1 to receive the UL grant from Cell 1.

In NR Rel-16, intra-Cell multi-Transmission/Reception Point (mTRP) operation for a Serving Cell is introduced. A UE could perform DL reception and/or UL transmission with a network via more than one TRP associated with a Serving Cell when operating in/being configured with intra-Cell multi-TRP operation for the Serving Cell. Before Rel-17, TRPs associated with one Serving Cell are considered to be synchronous. That is, (all) TRPs associated with the same Serving Cell share or are associated with a (single) Time alignment (or same time difference or timing advance between uplink and downlink, or $N_{TA}$). With Rel-18 mTRP operation, a more realistic scenario is considered, and different TRPs (in a serving cell) could have different Time alignment information or value for a UE (e.g., two different $N_{TA}$ value for different TRPs of a serving cell for a UE). For example, UE could be configured with a serving cell with a first and a second active/activated TRPs, where the first TRP could be associated with or configured with a first $N_{TA}$, and the second TRP could be associated with or configured with a second $N_{TA}$. The two TRPs of the serving cell could be associated with different Timing Advance Groups (TAGs). For example, a network could configured/provide different TAG for different TRPs in one serving cell. Alternatively, the network could configure/provide a TAG for primary TRP of (all) serving cell(s) in a CG. The network could configure/provide a second TAG for secondary TRP of (all) serving cell(s) in a CG. A primary TRP of a serving cell could be a TRP associated with beam(s)/TCI state(s) that are associated with/configured in the serving cell, or could be associated with an index indicating a primary TRP. A secondary TRP could be a TRP associated with beam(s)/TCI state(s) that are associated with/configured in non-serving cell (e.g., associated with a physical cell id, Physical Cell Identifier (PCI), different from PCI of a serving cell).

One issue could occur when a mobility procedure activates/switches/adds a serving cell (in a MCG and/or a SCG) with multiple TRPs, the UE may not be able to obtain time alignment value or time alignment information for each of the TRPs of the serving cell. The UE could perform random access procedure on both TRPs to obtain TAs for each TRP, but it could induce long latency for L1/L2 mobility procedure. While each TRPs could be associated with an (existing) TAG and the UE could reuse the existing TA information (e.g., TA information associated with other activated serving cells) for the added/switched serving cell, the UE may not be able to know the correct mapping and/or configuration for multiple TRPs.

Another issue could occur when the UE performs a mobility procedure to switch/add/activate a serving cell with single TRP (e.g., as a PCell or as a SCell). The UE could be configured/provided with more than one TA information for TRPs in a single Cell (in a Cell Group). In other words, the Cell could require different TAs (for different TRPs of the Cell) or be associated/configured with multiple TAGs (in the Cell configuration). The UE may not be able to determine which TA to apply for the added/switched/activated serving cell. In this invention, we introduce methods for handling Time alignment for L1/L2 mobility procedure regarding multi-TRP operation (with multiple/two TAs).

Indicate Multiple TA Information (in First or Second Information) for mTRP

One concept of the invention is that for a mobility procedure to a (target) Cell, a network could provide or indicate a first information indicating at least a first TA (Time alignment) information and a second TA information associated with the Cell.

The Cell could be a candidate Cell or target Cell for performing mobility procedure (e.g., the UE could switch its PCell to the Cell or could add/activate the Cell via a mobility procedure). Additionally and/or alternatively, the network could provide the second information indicating the first TA information and the second TA information associated with the (target) Cell (and the first information may not indicate the first and the second information). The Cell could be associated with or could comprise at least a first TRP and a second TRP. In response to (completion or initiation of) the mobility procedure to the Cell, the UE could apply the first TA information on the first TRP and apply the second TA information on the second TRP of the Cell.

The first TA information could be associated with (a third TRP of) a previous Cell of the UE. The second information could be associated with (a fourth TRP of) the previous Cell of the UE. The previous Cell could be a source cell of the UE (in the mobility procedure). The UE could switch its Serving Cell (e.g., PCell or SCell) from the previous Cell to the Cell.

The first and the second TA information could be $N_{TA}$. The first and the second TA information could be timing difference or timing advance between uplink and downlink (of a TRP). Additionally and/or alternatively, the first and the second TA information could include a timer (e.g., timingalignmenttimer). Additionally and/or alternatively, the first and the second TA information could be/contain a timing advance value (e.g., $N_{TA}$).

The first and the second TA information could be associated with different TRPs of the Cell. For example, the first TA information could be associated with the first TRP and the second TA information could be associated with the second TRP. The first TA information could indicate the first TRP. The second TA information could indicate the second TRP. Additionally and/or alternatively, the first and the second TA information could be associated with different TAGs of the Cell. For example, the first TA information could be associated with a first TAG and the second TA information could be associated with a second TAG of the Cell. The first TA information could indicate the first TAG (e.g., by TAG id). The second TA information could indicate the second TAG (e.g., by TAG id). The Cell could be configured with the first TAG and the second TAG (via a RRC configuration or via the first information and/or the second information).

For example, the first TRP could be associated with the first TAG of the Cell, and the second TRP could be associated with the second TAG of the Cell.

The UE could determine which TA information to apply on a TRP of the Cell based on at least an association between the TA information and the TRP indicated by the network (e.g., via the first and/or the second information).

Each of the first and the second TA information could be associated with a Sounding Reference Signal (SRS) resource set (e.g., each configured with a SRS resource set id). For example, the first information could contain or indicate an association between SRS resource set id "0" and the first TA information, and an association between SRS resource set id "1" and the second TA information.

Each of the first and the second TA information could be associated with one or more DL/UL TCI state(s). Each of the one or more DL/UL TCI state(s) could be associated with a TRP of the Cell.

Each of the first and the second TA information could be associated with one or more beam(s) (e.g., Synchronization Signal Block (SSB)-index and/or Channel State Information Reference Signal (CSI-RS) of the Cell.

Each of the first and/or the second TA information could be associated with one or more beam failure detection reference signal (BFD-RS) set(s) of the Cell.

(In response to initiation or completion of the mobility procedure to the Cell) the UE could perform UL transmission with TRP(s) of the Cell applying the TA information of the TRP(s) of the Cell. For example, the UE could perform UL transmission with the first TRP of the Cell using the first TA information and perform UL transmission with the second TRP using the second TA information.

The first and/or second information could indicate the UE to operate in mTRP operation of the Cell (after completion of or in response to the mobility procedure), e.g., using different TAs for different TRPs. The first and/or second information could include or indicate a configuration for the UE to operate in mTRP (e.g., performing reception/transmission with multiple TRPs) of the Cell, e.g., configuring different TAGs for different TRPs.

Alternatively, the first and/or the second information could indicate the UE to operate in single TRP (sTRP) operation of the Cell. For example, the first and/or the second information could indicate the UE to perform DL reception/UL transmission with the first TRP (and does not perform communication with other TRPs) in response to the mobility procedure.

TA Information is TAG

Additionally and/or alternatively, the first and/or the second TA information could indicate TAG(s) associated with TRP(s) of the Cell. For example, the UE could be configured with a first TAG (indicated by TAG id 1) and a second TAG (indicated by TAG id 2) for a Cell group (before the mobility procedure for the Cell). The first information could indicate an association between the first TAG and the first TRP of the Cell (e.g., the first TA information could be TAG id 1) and an association between the second TAG and the second TRP of the Cell (e.g., the second TA information could be TAG id 1). Each of the TAGs could be associated with one timing advance value.

For example, the UE could be configured with a first TAG (indicated by TAG id 1) and a second TAG (indicated by TAG id 2) for a Cell group (before the mobility procedure for the Cell). The UE could be configured with a third TAG (indicated by TAG id 3) and a fourth TAG (indicated by TAG id 4) for the Cell. The first information could indicate an association between the first TAG and the third TAG of the Cell and an association between the second TAG and the fourth TAG of the Cell. Each of the TAGs could be associated with one timing advance value.

For example, the first information could indicate a Cell configuration (e.g., ServingCellConfig-like message) associated with the (target) Cell. The Cell configuration could indicate a list or a mapping for association between one or more TAG-Id and BFD-RS set(s) and/or TCI state id(s). Additionally and/or alternatively, the second information could indicate a list or a mapping for the Cell indicating association between TAG-ID and TRP(s).

Additionally and/or alternatively, the first and/or the second information could indicate association between TAG(s) and BFD-RS set(s).

Additionally and/or alternatively, the first and/or the second information could indicate association between TAG(s) and TCI state(s).

Additionally and/or alternatively, the first and/or the second information could indicate association between TAG(s) and beam(s) (e.g., SSB-index or CSI-RS).

Additionally and/or alternatively, the first and/or the second information could indicate association between TAG(s) and spatial relation info.

Additionally and/or alternatively, the first and/or the second information could indicate association between TAG(s) and SRS resource set(s).

In response to (completion and/or initiation of) the mobility procedure adding/activating TRP(s) of the Cell, the UE could consider or configure the (active) TRP(s) of the Cell to be in associated TAG(s). The Cell could be considered to be in multiple TAG(s) if or when the (active) TRPs of the Cell are in multiple TAG(s).

Additionally and/or alternatively, the first and/or the second information could indicate TA information of multiple TRPs (e.g., more than two) of the Cell. The UE could determine which TA information to apply based on at least which associated TRP(s) are activated/indicated in response to the mobility procedure of the Cell.

TRPs Associated with Different TAs in One TAG

Additionally and/or alternatively, the first and/or the second information could indicate TA information of multiple TRPs of the Cell. The TA information could indicate a TAG associated with the multiple TRPs. Each of the TAG could contain more than one timing advance values. The TA information for a TRP could indicate a timing advance value associated with a TAG. For example, the TA information for a TRP could contain a TAG id of a TAG and a bit field (or an index), wherein the bit field (or the index) indicates an associated TA value of the TAG. For example, the bit field set to '0' indicates the TRP being associated with a first TA value (e.g., a TA value for a primary TRP) of the TAG, and the bit field set to '1' indicates the TRP being associated with a second TA value (e.g., a TA value for a secondary TRP) of the TAG.

TRPs Associated with a TA in One TAG and a TA+Offset in One TAG

Additionally and/or alternatively, the TA information (of a TRP) could contain an offset associated with a timing advance of a TAG. For example, a first TRP could be associated with TA information indicating a TAG id and an offset. The timing advance value for first TRP could be associated with timing advance (or timing advance command) of the TAG of the TAG id plus/minus the offset.

The mobility procedure may not contain/include the UE initiating a random access procedure to the (TRPs of) the Cell.

Additionally and/or alternatively, the first and the second information may not provide or indicate TA information for a TRP of the Cell. For a mobility procedure adding the Cell activating the TRP, the UE could determine whether to initiate a random access procedure (on the TRP of the Cell) based on at least a TA information associated with the TRP is provided or indicated in the first and/or the second information.

Indicate the UE to Reuse TA(s) of Source Cell for TRP(s) of Target Cell(s)

A network could indicate a UE whether to reuse a TA information associated with a previous Cell on the added target Cell(s). When more than one TA information is associated with the previous Cell, the network could indicate the UE which of the more than one TA information is to be reused on the added target Cell(s). Which TA information to be reused could be indicated via an index or identity associated with the TA information, e.g., TAG id. Additionally and/or alternatively, the network may not explicitly indicate which TA information to be reused. If (only) one TA information associated with the previous Cell is to be reused on the added target Cell(s), the one TA information could be associated with a smaller index (e.g., 0) of Control Resource Set (CORESETpool), SRS resource set, or BFD-RS set of the previous Cell. Additionally and/or alternatively, the one TA information could be associated with an additional PCI of the previous Cell.

Additionally and/or alternatively, the network could indicate the UE whether all of the more than one TA information are to be reused on the added target Cell(s). Additionally or alternative, the network may not explicitly indicate whether all of the more than one TA information are to be reused. The UE could derive whether all of the more than one TA information are to be reused based on whether the added target Cell(s) is configured to perform sTRP or mTRP operation (in UL). Additionally or alternative, the network could indicate the UE a number of the more than one TA information to be reused on the added target Cell(s). Additionally and/or alternatively, the network may not explicitly indicate the number. The UE could derive the number of the more than one TA information to be reused based on whether the added target Cell(s) is configured to perform sTRP or mTRP operation (in UL). If the added target Cell(s) is configured to perform mTRP operation (in UL), all or two TA information associated with the previous Cell could be reused on the added target Cell(s). If the added target Cell(s) is configured to perform sTRP operation (in UL), (only) one TA information associated with the previous Cell could be reused on the added target Cell(s).

Additionally and/or alternatively, the network could indicate the UE which or whether TRP of the added target Cell(s) could reuse TA information (associated with which or specific TRP) of the previous Cell.

Additionally and/or alternatively, for a mobility procedure adding target Cell(s), a network could indicate a UE to reuse TA information associated with previous Cell(s) on the added target Cell(s). The network could indicate the UE via a mapping between the previous Cell(s) and the target Cell(s) for reusing TA information of the previous Cell(s) on the target Cell(s). The network could indicate the UE via a mapping between TRP(s) of the previous Cell(s) and TRP(s) of the target Cell(s) for reusing TA information of the previous Cell(s) on the target Cell(s). Additionally and/or alternatively, the network could indicate an association or mapping between TAG(s) of the previous Cell(s) and TAG(s) (associated with the TRP(s)) of the target Cell(s) for reusing the TA information. The mapping or association could be indicated via the first and/or the second information in a mobility procedure.

The mapping or association could contain a mapping or an association between Cells. For example, the mapping or association could contain Cell index (e.g., serving cell index and/or physical cell id) indicating reuse of TA information between Cells. Alternatively or additionally, the mapping or association could contain a mapping between TRPs (across different Cells). For example, the mapping could contain a list of pairing of TRP indexes (e.g., CORESETpool index and/or SRS resource set and/or BFD-RS set) associated with different Cells. Additionally and/or alternatively, the mapping or association could contain a mapping or association between TAGs (across different Cells). For example, the mapping or association could indicate or include a TA information (e.g., TAG id of a source Cell or previous Cell) and a TAG (e.g., via TAG id) of a target Cell to which the UE applies the TA information.

Additionally and/or alternatively, the network could indicate the UE to reuse TA information of a TRP of the previous Cell on the target Cell. The network could indicate the UE via association between the target Cell and a Cell index of the previous Cell and/or a TRP index associated with the previous Cell. The UE could operate in single-TRP operation on the target Cell. The network could indicate (e.g., via the first or the second information) the UE to operate in single TRP operation on the target Cell after completion or initiation of the mobility procedure adding the target Cell. Additionally and/or alternatively, the network could indicate the UE to reuse TA information of a TAG id of the previous Cell on (a TAG of) the target Cell (e.g., via the first or the second information).

Single TRP Target Cell: Indicate which TA Information to Reuse

For example, the UE could operate in mTRP operation on a first TRP and a second TRP on the previous Cell. The UE could apply or maintain a first TA information for the first TRP and a second TA information for the second TRP. The network could provide a first information indicating/providing Cell configuration of the target Cell, wherein the Cell configuration could indicate/contain a Cell index indicating the previous Cell (indicating the UE to reuse TA information of the previous Cell). Additionally and/or alternatively, the Cell configuration could indicate a TRP index associated with the first TRP and/or a Cell index of the previous Cell indicating the UE to apply the first TA information (and does not apply the second TA information) of the previous Cell on (an active TRP of) the target Cell after completion or initiation of the mobility procedure.

An example is shown in FIG. 9. A UE performs mTRP operation on a Source Cell with two TAs, TA1 and TA2, on TRP1 and TRP 2 respectively. The UE could receive a first or a second information for (initiating) a mobility procedure on a Target Cell. The first and/or second information could indicate Cell configuration of the Target Cell. The first and/or second information could indicate the UE to perform single-TRP operation on the Target Cell. Alternatively, the target Cell is a non-serving cell and/or a serving cell, and the UE (already) performs sTRP operation one the target Cell before receiving the first and/or the second information. The first and/or second information could indicate the UE to reuse a TA information (e.g., TA2) of the Source Cell on the Target Cell. The first and/or second information could indicate the UE to activate TRP3 on the Target Cell. The UE could perform a mobility procedure adding or activating the target Cell (as a PCell or SCell) (in response to receiving a second information). In response to initiation or completion of the mobility procedure, the UE could apply the TA2 on the TRP3 of the Target Cell. The UE may not perform a random access procedure on the Target Cell in the mobility procedure.

An example of an association or mapping is shown in FIG. 9A. The association or mapping could indicate a TA information to be reused or a TA information to be applied (e.g., a $N_{TA}$) for a target Cell. The association or mapping could indicate a TRP or a TAG id of the target Cell on which the UE could apply or reuse the TA information. In this example, the association or mapping (carried or included in the first and/or the second information) could indicate a TAG id X associated with a source Cell/source gNB and a TAG id Y of the target Cell, and according to the association, the UE could apply the TA (e.g., $N_{TA}$) of the TAG X to TAG Y of the target Cell (in response to receiving the second information or in response to initiation or completion of the mobility procedure).

mTRP: Mapping Between Different TA to be Reused

Alternatively, the UE could operate in multiple TRP (mTRP) operation on the target Cell (in response to adding/activating the target Cell). The network could indicate (e.g., via the first or the second information) the UE to operate in multiple TRP operation on the target Cell after completion or initiation of the mobility procedure adding the target Cell. The network could indicate a mapping between TRPs of the target Cell and TA information to be reused (via the first or the second information). Alternatively, the network could indicate a mapping between TAGs of the target Cell and TA information to be reused (via the first or the second information).

The mapping could contain a mapping or association between TRPs and TAGs (e.g., TAG ids) associated with a previous Cell. The mapping could contain a mapping or association between TRPs between the target Cell and the previous Cell. The mapping could contain a list of Cell/TRP index of a previous or activated Cell paired with TRP of target Cell.

For example, the UE could operate in mTRP operation on a first TRP and a second TRP on the previous Cell. The UE could apply or maintain a first TA information for the first TRP and a second TA information for the second TRP. The network could provide a first information indicating/providing Cell configuration of the target Cell, wherein the Cell configuration could indicate/contain a Cell index indicating the previous Cell (indicating the UE to reuse TA information of the previous Cell). Additionally and/or alternatively, the Cell configuration could indicate an association between the first TRP of the previous Cell and a third TRP associated with the target Cell indicating the UE to apply the first TA information (and does not apply the second TA information) of the first TRP of the previous Cell on the third TRP of the target Cell after completion or initiation of the mobility procedure. Additionally and/or alternatively, the Cell configuration could indicate an association between the second TRP of the previous Cell and a fourth TRP associated with the target Cell indicating the UE to apply the second TA information (and does not apply the first TA information) of the second TRP of the previous Cell on the fourth TRP of the target Cell after completion or initiation of the mobility procedure.

Figure 10:
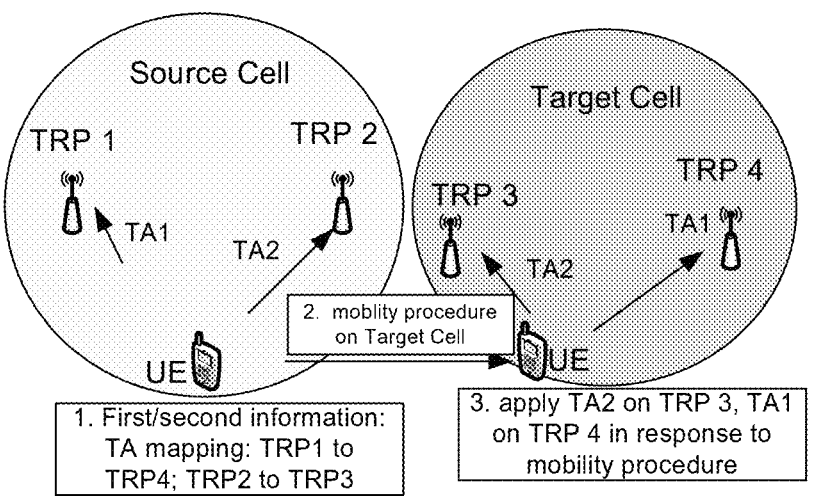
FIG. 10 is a diagram example of a UE performing mTRP operation on a Source Cell with two TAs, TA1 and TA2, on TRP1 and TRP 2, respectively, in accordance with embodiments of the present invention.

An example is shown in FIG. 10. A UE performs mTRP operation on a Source Cell with two TAs, TA1 and TA2, on TRP1 and TRP 2, respectively. The UE could receive a first or a second information for (initiating) a mobility procedure on a Target Cell. The first and/or second information could indicate Cell configuration of the Target Cell. The first and/or second information could indicate the UE to perform multi-TRP operation on the Target Cell (on TRP 3 and TRP 4). Alternatively, the target Cell is a non-serving cell and/or a serving cell, and the UE (already) performs mTRP operation one the target Cell before receiving the first and/or the second information. The first and/or second information could indicate the UE to reuse TA information (e.g., TA1 and TA2) of the Source Cell on the Target Cell. The first and/or the second information could contain or indicate a mapping between TRPs of the Source Cell and the Target Cell. The mapping could indicate the TA information of TRP 1 is reused for TRP 4, and the TA information of TRP2 is reused for TRP3. The first and/or second information could indicate the UE to activate TRP3 and TRP 4 on the Target Cell. The UE could perform a mobility procedure adding or activating the target Cell (as a PCell or SCell) (in response to receiving a second information). In response to initiation or completion of the mobility procedure, the UE could apply the TA2 on the TRP3 of the Target Cell and TA1 or TRP4. The UE may not perform a random access procedure on the Target Cell in the mobility procedure.

One TRP to Many TRPs

Figure 11:
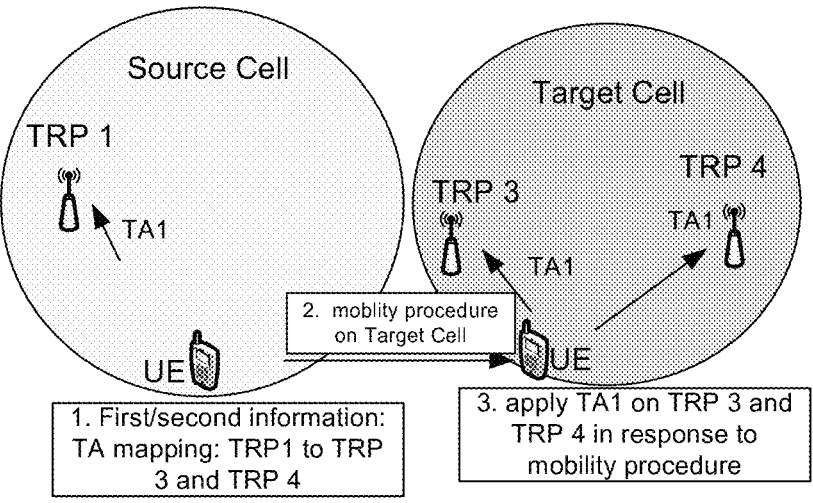
FIG. 11 is a diagram example of mapping (indicated in the first and/or second information) indicating the UE to reuse TA information of TRP1 of the Source Cell to TRP3 and TRP4 of the Target Cell, in accordance with embodiments of the present invention.

Additionally and/or alternatively, the mapping could indicate TA information of one TRP of the Source/previous Cell to be reused for TA of more than one TRPs of the target Cell. The UE could operate in sTRP operation in the Source Cell. The UE could (be indicated to) operate in mTRP operation in the target Cell. An example is shown in FIG. 11. The mapping (indicated in the first and/or second information) indicates the UE to reuse TA information of TRP1 of the Source Cell to TRP3 and TRP4 of the Target Cell.

TA Information Contains Indication of Reusing One or Two TA

Additionally and/or alternatively, the first and/or the second information (provided by the network) could indicate the UE to reuse one or more TA information of TRP(s)/TAG (s) of the Source/previous Cell.

For example, a field could be provided in the first and/or the second information. For example, the field could be a single bit indicating which TA information to reuse for the target Cell. For example, the field indicating "0" indicates that $N_{TA}$ of a first TRP (e.g., CORESETpool index=0 or BFD-RS set=0) of the previous/source cell is reused for the target Cell; the filed indicating "1" indicates that $N_{TA}$ of a second TRP (e.g., CORESETpool index=1 or BFD-RS set=1) of the previous/source cell is reused for the target Cell. Take FIG. 9 for example, the network could set the field in the first and/or the second information to indicate the UE to reuse TA2 of TRP2 of the source cell (and does not use TA1 of the TRP1). Additionally and/or alternatively, TA information of the TRPs in the previous Cell could be associated with one TAG, and the field could indicate an index associated with one TA information of the TAG (e.g., TA1 could be associated with TA index 1 in a TAG, and TA2 could be associated with TA index 2 in the TAG), and the UE could reuse the indicated TA information for (TRP of) the target Cell.

Additionally and/or alternatively, the field could indicate both (or all) TA information for TRPs of the previous cell are reused for the target Cell. The UE could perform mTRP operation on the target Cell using the both TA information (e.g., TA1 and TA2).

Additionally and/or alternatively, the UE could determine whether to reuse one or more than one TA information of the source/previous Cell based on at least whether the target Cell is configured/activated with single or multiple TRPs (in response to the mobility procedure). If the UE is indicated with sTRP operation on the target Cell, the UE reuses one TA information (e.g., first TA information or TA information of a TRP indicated by first/second information) from the previous Cell.

Only Indicates Reuse TA on One TRP, the Other should Initiate RACH

It is possible that only one TA of the target Cell is available (e.g., no suitable source TA to be reused, or cannot derive all TAs in time).

The UE could perform mTRP operation on a third TRP/ TAG and a fourth TRP/TAG on the target Cell (in response to completion or initiation of the mobility procedure adding the target Cell). The first and/or the second information could indicate the UE to reuse TA information of a previous Cell on one TRP/TAG (e.g., on the third TRP/TAG) and no TA information reuse is indicated for another TRP/TAG (e.g., no TA reuse for the fourth TRP/TAG). In response to initiation of the mobility procedure (e.g., in response to receiving the second information), the UE could initiate or perform a random access procedure on the another TRP (e.g., the fourth TRP) to obtain TA information for the another TRP on the target Cell (and does not perform random access procedure on the one TRP).

In other words, the UE could determine whether to initiate a random access procedure/Random Access Channel (RACH) on a TRP of a target Cell in a mobility procedure (e.g., triggered/initiated by the second information) based on whether all TA information for more than one TAGs of the target Cell is available. Additionally and/or alternatively, the UE could determine whether to initiate a random access procedure/RACH on a TRP of a target Cell in a mobility procedure (e.g., triggered/initiated by the second information) based on whether any TAG of the target Cell does not have valid TA information. Additionally and/or alternatively, the UE could determine whether to initiate a random access procedure/RACH on a TRP of the target Cell in the mobility procedure (e.g., triggered/initiated by the second information) based on whether TA information of a TAG in the more than one TAGs of the target Cell, which is associated with the TRP, is available.

For example, if or when the network indicates (only) one TA information (for a TRP) for the target Cell (with multiple TRPs associated with different TAGs), the UE could initiate a random access procedure on the target Cell for acquiring TA for the TRP or TAG of the target Cell that is not provided with a TA.

For another example, if or when each of the TAGs of the target Cell is indicated with TA (by the network), the UE may not initiate a random access procedure (on the target Cell) in the mobility procedure.

For another example, if or when no TAG of the target Cell is indicated with TA (by the network), the UE could initiate a random access procedure (on the target Cell) in the mobility procedure.

Figure 12:
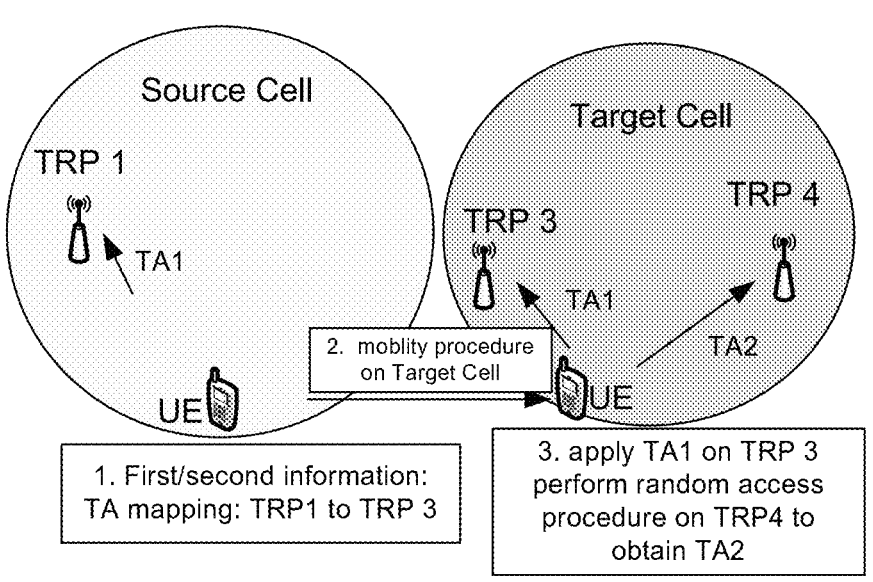
FIG. 12 is a diagram example of a UE performing communication with Source Cell on at least TRP1 and maintaining TA information, TA1, with the TRP1, with the first and/or the second information indicating a mapping of TA information between TRP1 of the Source Cell and TRP3 of the Target Cell, in accordance with embodiments of the present invention.

An example is shown in FIG. 12. The UE performs communication with Source Cell on at least TRP1 and maintain TA information, TA1, with the TRP1. The first and/or the second information indicates a mapping of TA information between TRP1 of the Source Cell and TRP3 of the Target Cell. The network could indicate the UE to operate in mTRP operation on TRP 3 and TRP 4 on the target Cell (via the first and/or the second information). In response to initiation of a mobility procedure adding the Target Cell, the UE applies TA1 on the TRP 3 and does not apply TA1 on the TRP4. The UE initiates a random access procedure on TRP 4 to obtain TA information, TA2, associated with TRP 4.

Additionally and/or alternatively, the UE could reuse or keep TA information of one of the (active) TRP(s) of the previous Cell on the target Cell (and does not reuse all and does not reuse TA information of another (active) TRP). The first and/or the second information could indicate which TA information of the (TRPs of) the previous/source Cell could be reused/kept on which TRP(s) of the target Cell. If or when TA information of a TRP of the target Cell is not reused from the source Cell (or is not provided by network), the UE could initiate a random access procedure to the TRP (to obtain the TA).

Figure 13:
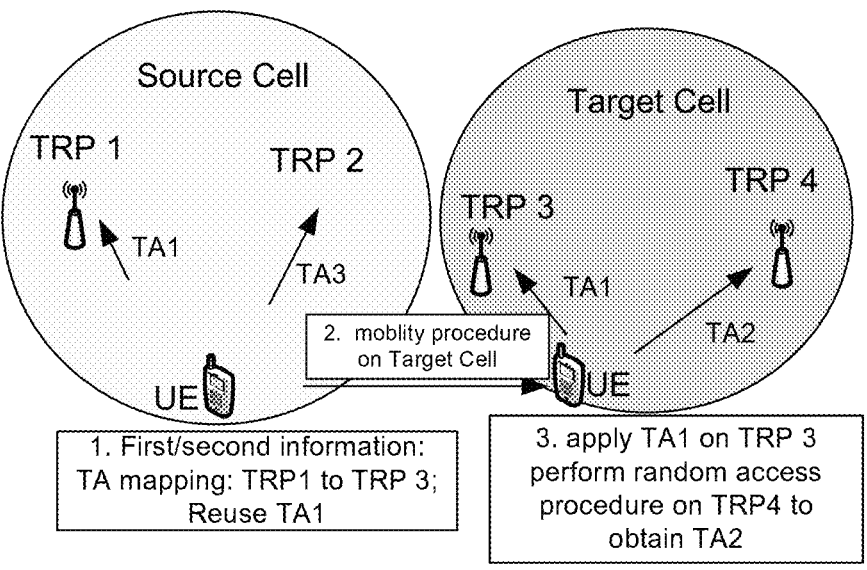
FIG. 13 is a diagram example of a UE performing communication with Source Cell on TRP1 and maintain TA information, TA1, with the TRP1, the UE performing communication with Source Cell on TRP2 and maintaining TA information, TA3, with the TRP2, and the first and/or the second information indicating a mapping of TA information between TRP1 of the Source Cell and TRP3 of the Target Cell, in accordance with embodiments of the present invention.

An example is shown in FIG. 13. The UE performs communication with Source Cell on TRP1 and maintain TA information, TA1, with the TRP1. The UE performs communication with Source Cell on TRP2 and maintain TA information, TA3, with the TRP2. The first and/or the second information indicates a mapping of TA information between TRP1 of the Source Cell and TRP3 of the Target Cell. The first and/or the second information does not indicate mapping of TA information associated with TRP 4 of the target Cell. The network could indicate the UE to operate in mTRP operation on TRP 3 and TRP 4 on the target Cell (via the first and/or the second information). In response to initiation of a mobility procedure adding the Target Cell, the UE applies TA1 on the TRP 3 and does not apply TA of the source cell on the TRP4. The UE initiates a random access procedure on TRP 4 to obtain TA information, TA2, associated with TRP 4.

Figure 13A:
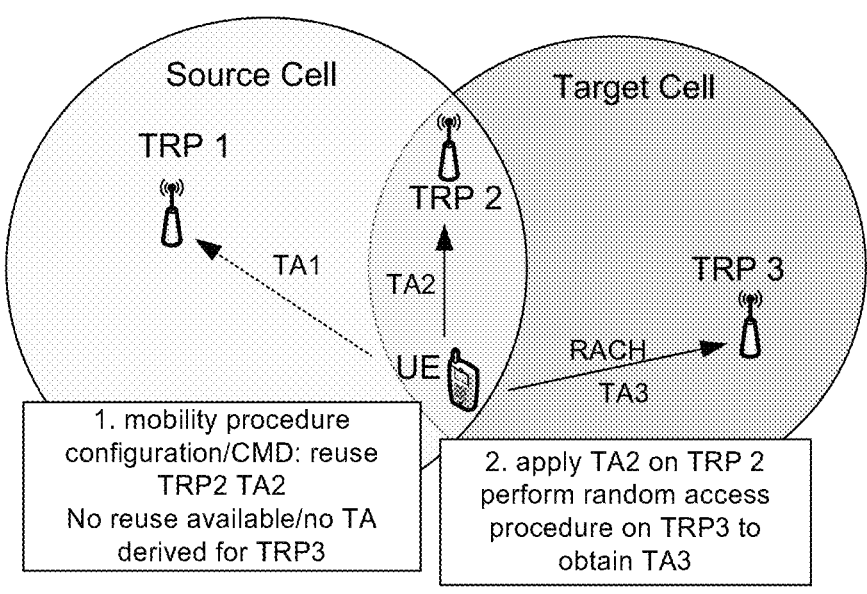
FIG. 13A is a diagram example of a UE performing communication with a source gNB via a Source Cell on TRP 1 and TRP 2, with the UE maintaining a first TA information, TA1, for the TRP 1 and a second TA information, TA2, for the TRP 2, in accordance with embodiments of the present invention.

Another example is shown in FIG. 13A. The UE could perform communication with a source gNB via a Source Cell on TRP 1 and TRP 2. The UE could maintain a first TA information, TA1, for the TRP 1 and a second TA information, TA2, for the TRP 2. The UE could be (pre-)configured (e.g., via a first information of a mobility procedure) with a target Cell with multi-TRP operation, TRP2 and TRP3. The UE could be indicated, via the first information or a second information (e.g., a cell switch command) with reusing TA information of the TRP2 from the source Cell to the TRP2 of the target Cell. The UE may not be indicated with TA information for TRP3 (e.g., no reusable TA information or non-derivable for the TRP3). In response to receiving a second information in a mobility procedure switching to/adding the target Cell. The UE applies TA2 on the TRP2 of the target Cell and (based on no TA available for TRP3) perform random access procedure on the TRP3 to obtain TA information associated with the TRP3, TA3.

Figure 13B:
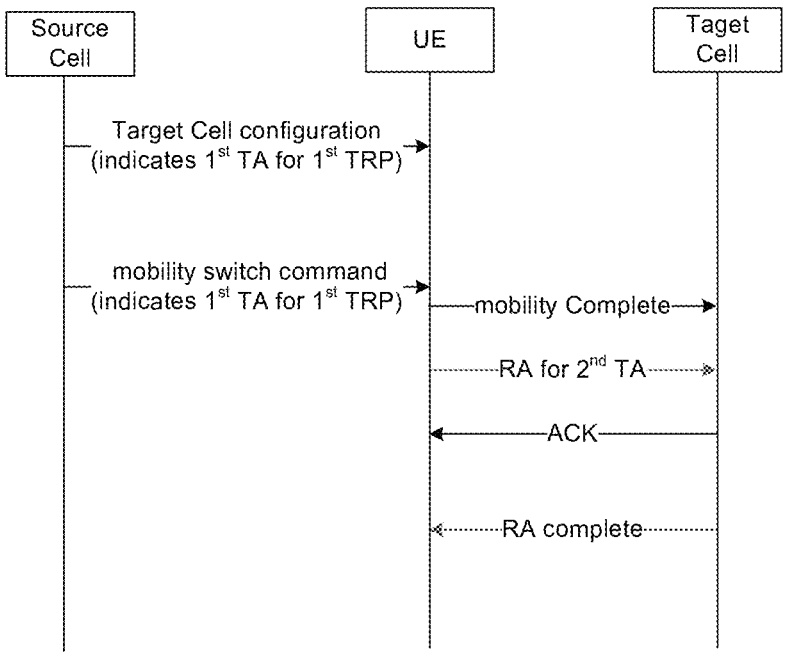
FIG. 13B is a diagram example of a mobility procedure for mTRP target Cell, in accordance with embodiments of the present invention.

An example of mobility procedure for mTRP target Cell is shown in FIG. 13B. The UE could be (pre-)configured (e.g., via a first information of a mobility procedure) with a candidate cell, Target Cell, for mobility procedure. The Target Cell could be configured with a Cell with multiple TRPs with multiple TAs. The UE could receive, a mobility switch command, to switch its PCell (or add as serving cell) on the target Cell. The mobility switch command (e.g., a second information) and/or the (pre-)configuration could indicate a $1^{st}$ TA for $1^{st}$ TRP of the Target Cell. The mobility switch command and/or the (pre-)configuration may not indicate TA for $2^{nd}$ a TRP of the Target Cell. In response to the mobility switch command, the UE applies the $1^{st}$ TA on the $1^{st}$ TRP, and transmits mobility complete message to the network (e.g., a RACHless procedure on $1^{st}$ TRP) and, in response to the mobility switch command, the UE initiates a random access procedure to the $2^{nd}$ TRP of the Target Cell to obtain a $2^{nd}$ TA of the Target Cell.

The TRP index could be SRS resource set id and/or BFD-RS set id and/or CORSETpool index and/or TCI state id.

Indicate Cell Index/TRP Index

For example, the network could indicate a cell index associated with the previous Cell (in the first or second information) in the mobility procedure adding/activating the target Cell. The UE could determine to reuse (one or all) TA information of the previous Cell on the target Cell in response to initiation or completion of the mobility procedure adding/activating the target Cell.

The previous Cell could be activated and/or added (and may not be deactivated) before the mobility procedure. The UE could perform (DL and/or UL) communication with the previous Cell before the mobility procedure. The UE could release/deactivate the previous Cell before the mobility procedure. Alternatively, the UE may not release or deactivate (e.g., still perform communication with) the previous Cell after completion or initiation of the mobility procedure.

Additionally and/or alternatively, for a mobility procedure switching PCell of the UE from a source Cell to the Cell, the network could indicate the UE to reuse TA information associated with the source Cell.

UE-Determine

Target Cell is a (Activated) Non-Serving Cell or a Serving Cell

Additionally and/or alternatively, the UE could reuse TA information of the target Cell on the target Cell (itself) after mobility procedure associated with the target Cell. The mobility procedure could be adding/activating the target Cell as a Serving Cell (e.g., a PCell or a SCell). The target Cell could be a non-serving Cell before the mobility procedure (e.g., a Cell with a physical Cell id, physid, different from Serving Cells). The target Cell could be a (activated) Serving Cell (e.g., SCell) before the mobility procedure.

For the above and herein concepts, embodiments, and examples:

The mobility procedure of a Cell could be a mobility procedure adding/activating (TRPs of) the Cell, with the UE considers the Cell as a target Cell.

For a mobility procedure adding the target Cell, the UE could switch its PCell to the target Cell. Alternatively, the UE could switch its SpCell (e.g., from a previous Cell) to the target Cell.

Additionally and/or alternatively, for a mobility procedure adding the target Cell, the UE could add the target Cell as a (activated or deactivated) Secondary Cell.

The mobility procedure could comprise the UE switching its PCell. Additionally and/or alternatively, the mobility procedure could comprise the UE adding and/or releasing SCell(s).

A previous Cell could be a source cell in a mobility procedure (L1/L2 handover-like procedure). The previous Cell could be a PCell or (activated) SCell. The previous Cell could be a timing reference Cell (of a TAG associated with a target Cell). The previous Cell could be released/deactivated in response to (completion of) the mobility procedure. Alternatively, the previous Cell may not be released/deactivated in response to (completion of) the mobility procedure.

To reuse or keep a TA information of a first TRP (of a Cell) on a second TRP (of another Cell), the UE could apply or keep the TA information on the second TRP (and clear the TA information of the first TRP).

To reuse or keep a TA information of a first TRP (of a Cell) on a second TRP (of another cell), the UE may not stop a time alignment timer associated with the TAG of the TA information.

A TAG could be associated with or could indicate one TA information (e.g., a $N_{TA}$ or a TA command). Alternatively, a TAG could be associated with more than one TA information for (different) TRPs of one or more Cells. Additionally and/or alternatively, a TAG could indicate one TA information (for a TRP of a Cell) and an offset for calculating or deriving TA information (for another TRP in a mTRP Cell).

A mobility procedure could be used to add, release or switch one or more of the UE's Secondary Cell(s). The mobility procedure may not add, release or switch PCell and/or PSCell of the UE. The mobility procedure could be triggered by a second information.

Additionally and/or alternatively, a mobility procedure could contain that the UE triggers and/or generates a message (and transmits) to a target cell (PCell, PSCell, neighbor cell or a SCell). The mobility procedure could contain the UE initiate a (contention-free) random access procedure on the target cell. The random access procedure could be initiated in response to the message becoming available for transmission. The message could indicate a completion of the mobility procedure. The mobility procedure could be used to switch the UE's Primary Cell (or Primary Secondary Cell) to the target cell. The UE could consider the mobility procedure to be completed in response to a completion of the random access procedure. The UE could consider the mobility procedure to be completed in response to receiving a positive acknowledgement associated with the message (from the target cell). The UE could initiate a random access procedure or transmits a preamble on Cell(s) via one or more beam(s) associated with the Cell(s) indicated in the second information. The mobility procedure could contain the UE switch its SpCell to a target Cell and/or add/release one or more secondary Cell(s) associated with one or more Cell group(s) (CG(s)).

Figure 14:
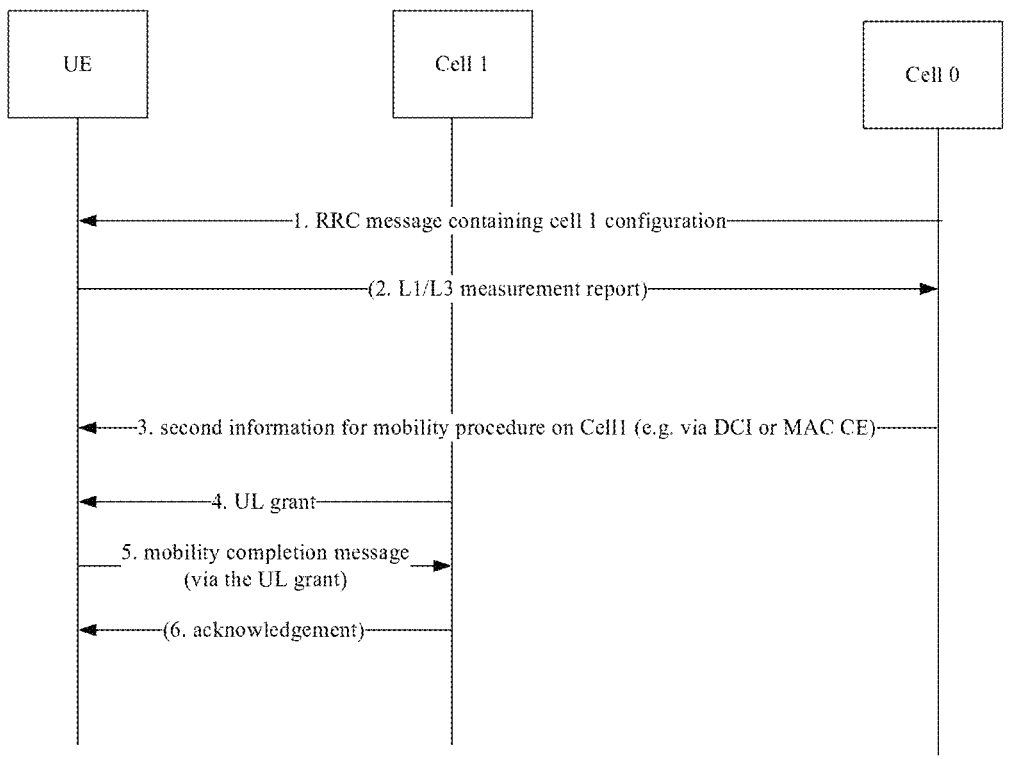
FIG. 14 is a diagram example of the target cell transmitting an acknowledgement to the UE indicating completion of the procedure, in accordance with embodiments of the present invention.

A (L1/L2) mobility procedure could contain a serving cell providing first information to a UE indicating/providing configuration associated with at least a target cell. The first information could provide configuration associated with one or more Cell(s) or one or more Cell group(s) (CG(s)). The configuration could contain cell addition information and/or beam information associated with the target cell. The first information could be a dedicated signaling to the UE. The source cell could provide second information to the UE indicating initiation of a mobility procedure to the target cell. The procedure could contain a random access procedure and/or one or more Physical Uplink Shared Channel (PUSCH) transmission and/or beam (TCI state) activation. The second information does not contain RRC signaling and/or RRC messages. The second information could be a L1 (e.g., Downlink control information) or a L2 (e.g., MAC control element) message. The first information and the second information could be transmitted in different signaling and/or timings. The UE does not initiate the mobility procedure to the target cell in response to (reception of) the first information. The UE could transmit a mobility completion message to the target cell indicating a completion of the procedure. Additionally and/or alternatively, the target cell could transmit an acknowledgement to the UE indicating completion of the procedure. An example is shown in FIG. 14. The UE could consider the mobility procedure to be completed in response to acknowledgement from the target cell. Alternatively, the UE could consider the mobility procedure to be complete in response to transmission of the mobility completion message. Alternatively, the UE could consider the mobility procedure to be complete in response to completion of a random access procedure (associated with the mobility procedure).

The first information could contain (first/second) time alignment (TA) information associated with the target Cell and/or the one or more Cell(s) (and the second information does not contain the TA information). Additionally and/or alternatively, the second information could contain (first/second) time alignment (TA) information associated with the target Cell and/or the one or more Cell(s) (and the first information does not contain the TA information). In response to initiating or completion of a mobility procedure associated with the target Cell, the UE could apply the TA information of the target Cell. The TA information could be a $N_{TA}$ or timing difference between uplink and downlink associated with a Cell (e.g., target Cell). Additionally and/or alternatively, the TA information could include a Timing Advance Command or a TAG id for a TA group associated with a Cell (e.g., target Cell).

The first information could contain beam (e.g., DL/UL TCI state id or spatial relation info) information associated with at least a target Cell and/or one or more Cell(s). Additionally and/or alternatively, the second information could contain or indicate beam information associated with at least the target Cell and/or one or more Cell(s). For one example, the first information could indicate a list of beams for a target Cell, and the second information could indicate one beam in the list of beams for the target Cell, and the UE uses the one beam indicated in the second information for mobility procedure to the target Cell. Alternatively, the first information may not contain beam information (and the second information contains beam information). The UE could transmit mobility completion message to the target Cell via beam(s) indicated in the first or second information associated with the target Cell. The UE could activate beam(s) or TCI state(s) indicated in the second information in response to receiving the second information or in response to initiating the mobility procedure. The second information could indicate a BWP (e.g., a BWP id) of the target Cell on which the UE performs a mobility procedure.

The first and/or the second information could indicate TRP information associated with at least a target Cell and/or one or more Cell(s). The first information could indicate whether to activate one or more than one TRP(s) (e.g., operating in single or multiple TRP operation) for the target Cell and/or the one or more Cell(s) in response to adding/activating the target Cell and/or the one or more Cell(s).

The first and/or the second information could indicate an association of TA information between (a TRP of) a target Cell and (a TRP of) a previous/source Cell. For example, the first and/or the second information could indicate a mapping between TRP of the target Cell and the previous/source Cell. Additionally and/or alternatively, the first and/or the second information could indicate an association between TAG(s) and TRP(s) of target Cell(s). Additionally and/or alternatively, the first and/or the second information could indicate an association between $N_{TA}$ in a TAG and TRP(s) of target Cell(s).

The mobility procedure could contain part of handover procedure or reconfiguration with sync procedure.

A completion of a mobility procedure could be a completion of a random access procedure associated with the mobility procedure. Alternatively, the completion of the mobility procedure could be a transmission of a mobility completion message (to the target cell). Alternatively, the completion of the mobility procedure could be a reception of an acknowledgement of the mobility completion message (from the target cell).

The mobility procedure is not a reconfiguration with sync (e.g., not a Layer-3 handover).

The first information could be a RRC message (e.g., a RRCReconfiguration message).

The first information could contain UL and/or DL resource configuration associated with the target cell (and/or one or more Cells to be added as SCell when initiating or completing the mobility procedure).

The first information could contain ServingCellConfigCommon of the target cell and the one or more Cells. The one or more Cells could be candidate Serving Cells for MCG or SCG of the UE.

The second information is not a RRC message/signaling. The second information could contain a Physical Downlink Control Channel (PDCCH) signaling (e.g., DCI) and/or MAC CE. The second information could indicate the UE to initiate a mobility procedure adding/activating (a part of) the one or more Cells. Alternatively, the second information could indicate the UE to adding/activating (a part of) the one or more Cells (as Secondary Cells or as Primary Cells). The second information could indicate Cells (e.g., via an index indicated in the first information or a SCell index) to be added/switched/released (via a mobility procedure). In response to (completion of) adding/activating the (a part of) one or more Cells, the UE could consider the (a part of) one or more Cells as Serving Cells.

The first information could contain configurations of one or more Cell(s) or CG(s). The second information could at least indicate at least one of the one or more Cell(s) or CG(s) to the UE. The second information may not contain or indicate the configurations of the one or more Cell(s) or CG(s). The second information could indicate the UE to initiate a mobility procedure (associated with the one or more Cells or CGs). The second information could indicate the UE to add/activate at least one of one or more Cell(s) (as Serving Cells). Each Cell of the one or more Cell(s) could be associated with a Cell group (MCG or SCG). The UE could initiate a mobility procedure in response to receiving the second information. The UE may not initiate the mobility procedure in response to receiving the first information. Additionally and/or alternatively, the UE could consider at least one of the one or more Cell(s) to be a Serving Cell (e.g., the Serving Cell could be a PCell, a SCell, or a PSCell) of the UE in response to a completion of the mobility procedure initiated in response to receiving the second information. The UE does not consider the at least one of the one or more Cells to be a Serving Cell of the UE in response to receiving the first information. Additionally and/or alternatively, the one or more Cell(s) could comprise Cell(s) associated with physical cell id (PCI)(s) different from Serving Cell(s) of the UE before receiving the first and/or the second information. Additionally and/or alternatively, the one or more Cell(s) could comprise Cell(s) associated with physical cell id (PCI)(s) different from Serving Cell(s) of the UE before receiving the first and/or the second information.

The second information could indicate at least an index associated with a non-serving cell (e.g., AdditionalPCIIndex) (if or when the target Cell is the non-serving cell).

The second information could indicate a type (e.g., neighbor cell and/or (activated) non-serving cell and/or serving cell) of the target Cell. The second information could indicate a type of an index of the target Cell. For example, the type of the index could be additional PCI index or a serving cell index or a candidate (neighbor) cell index.

The second information may not indicate an (cell) index associated with a target Cell. The second information could indicate a beam associated with a target Cell (e.g., associated with an additional PCI). The UE could determine the target Cell based on the indicated beam. The association between the beam and the target Cell could be (pre-)configured (before receiving the second information). The beam could be an activated beam or a beam to be activated. The UE could activate the beam in response to receiving the second information.

To reuse a beam associated with a cell, the UE could keep the beam activated in response to or after the cell becomes a serving cell. To reuse a beam associated with a cell, the UE could keep the beam activated in response to or after (completion of) the mobility procedure associated with the cell.

The first information and the second information could be transmitted in different signalings.

The first information and the second information could be transmitted at different timings.

The configurations could include serving cell configuration.

The one or more Cell(s) or CG(s) could contain Serving Cell(s) and/or non-serving Cell(s).

The second information may not be SCell Activation/Deactivation MAC CE.

The second information may not indicate ServCellIndex or physcellid of the one or more Cell(s). The second information could indicate Cell Group (e.g., MCG or SCG) associated with the one or more beam(s) and/or Cell(s).

The mobility procedure could contain part of handover procedure or reconfiguration with sync procedure.

The mobility procedure could comprise the UE transmitting UL data or control information to the target cell. The UL data could contain information associated with the UE (e.g., Cell-Radio Network Temporary Identifier (C-RNTI) MAC CE). The UL data could be transmitted via PUSCH. The UL control information could be transmitted via Physical Uplink Control Channel (PUCCH).

The message could be a mobility completion message. The mobility completion message may not contain a RRC message. The mobility completion message could contain a MAC CE. The mobility completion message could be a PUCCH or PUSCH transmission.

The one or more Cell(s) may not be a Primary Cell (PCell) or a target Cell. The second information could indicate both a target Cell and additionally the one or more Cell(s) (e.g., via the Cell information) to the UE, where the UE initiates a mobility procedure and consider the target Cell as PCell in response to completion (or initiation) of the mobility procedure.

To add a (candidate Serving) Cell, the UE adds the Cell as SCell (or PCell) and apply the Cell's configuration. The Cell's configuration could be indicated in the first information (e.g., parameters in sCellConfigCommon and sCellConfigDedicated).

The index or id (provided or indicated in the first information) may not be ServCellIndex. The index or id may not be sCellIndex.

The Cell information (in the second information) could indicate one or more Cells to be added (in a MCG and/or SCG) in response to receiving the second information.

A beam could be associated with a spatial relation info or associated with a TCI state. A TCI state could be associated with PDCCH monitoring (on a CORESET of a Cell). A TCI state could be associated with Physical Downlink Shared Channel (PDSCH) reception (on a Cell). A spatial relation info could be associated with PUCCH/PUSCH transmission.

The one or more beam(s) (indicated in first or second information) could be associated with TCI states for PDCCH, PDSCH monitoring. The one or more beam(s) (indicated in first or second information) could be associated with spatial relation info for SRS, CSI-RS, PUCCH, or PUSCH transmission.

A current or existing Cell could be a Cell configured/activated/added before receiving the second information or before initiating the mobility procedure. The current or existing Cell could be a Secondary Cell (or a PCell). The current or existing Cell could be indicated in the first or second information. The UE may not remove/deactivate/release the current or existing Cell (in response to receiving the second information or in response to initiating or completing the mobility procedure) if or when the Cell is indicated in the second information.

The group of beam(s) could contain (only) a single beam. Alternatively, the group of beam(s) could contain more than one beam.

The one or more beam(s) could be indicated via reference signals or TCI state(s). Each of the one or more set(s) could be associated or be indicated with one or more reference signal(s) (e.g., SSB or CSI-RS). The one or more beam(s) could be SSB or CSI-RS. Each of the one or more beam(s) could be associated with (DL or UL) TCI state(s) (e.g., indicated via TCI-stateId) and/or spatial relation info (e.g., spatial relation info ID). The one or more beam(s) could be used to monitor/receive DL transmission from Cell(s) in the one or more Cell(s) when activating/adding the Cell(s) in a mobility procedure or when receiving a second information. Additionally and/or alternatively, the one or more beam(s) could be associated with spatial relation info (e.g., via spatial relation info ID in the first information).

For a UE performing inter-Cell multi-TRP (mTRP) operation, the UE could perform DL and/or UL transmissions via more than one PDCCH, PDSCH, PUCCH, PUSCH associated with different Cells. The DL and/or UL transmissions could contain transmitting a same TB on different channels associated with (different TRPs of) different Cells. The UE could perform multi-PDCCH/PUSCH/PDSCH/PUCCH communication with a network via a TRP on a Serving Cell and another TRP on a non-serving Cell (e.g., an assist Cell or an additional Cell) associated with the Serving Cell. The Serving Cell could be configured (for the UE) with one or more non-serving Cell for inter-Cell mTRP operation.

The signaling or the acknowledgment from the target Cell could be a UL grant (for a new transmission). The UL grant could be for a Hybrid Automatic Repeat Request (HARQ) process used for the transmission of a mobility completion message. The UE could consider a mobility procedure to be completed in response to receiving the signaling or the acknowledgement.

For second information indicating different Logical Channel IDs (LCIDs), the second information could be different MAC CEs.

The source Cell of the UE could be a Serving Cell (or PCell) before receiving the second information. Additionally and/or alternatively, the source Cell of the UE could be a Serving Cell providing the second information.

The target Cell of the UE could be a new Serving Cell (or new PCell) added in response to the mobility procedure.

The time alignment (TA) information (of a TRP or a Cell) could include timing difference or timing advance between uplink and downlink (e.g., $N_{TA}$). The TA information could include a (time alignment) timer or a timing advance command. The TA information could contain or could be timing advance information. The TA information could contain or indicate a TAG (e.g., via a TAG-id). The TA information could indicate TA mapping or sharing between TRPs of a source cell and a target cell. The TA information could indicate offset or index associated with (a $N_{TA}$ or a TA command of) a TAG. The TA information associated with a TRP could contain a TAG id or a TRP id of a source Cell (or a reference Cell).

The UE could perform failure handling of the mobility procedure in response to a failure of the mobility procedure. When the UE performs a failure handling of the mobility procedure, the UE could consider the mobility procedure to be failed.

A non-serving Cell (or an additional Cell or an Assist Cell) could be a Cell associated with a physical Cell id different from (any of) physical Cell id of Serving Cell(s). A non-serving Cell could be associated with a serving Cell (e.g., the non-serving Cell could be associated with a PhysCellId configured in additionalPCI in a serving Cell configuration, ServingCellConfig). The UE could perform (inter-TRP) transmission with the non-serving Cell. A neighbor cell could be a Cell associated with a frequency indicated in a measurement object (e.g., configured via MeasObjectNR). The UE does not perform inter-TRP operation with the neighboring Cell. The neighbor cell may not be a non-serving Cell. Additionally and/or alternatively, the neighbor cell could be a non-activated non-serving Cell. A neighbor cell may not be associated with a PCI in a serving Cell configuration, ServingCellConfig.

A serving Cell could be associated with (e.g., configured with) a maximum number of additional PCI(s) (e.g., 7), each of the additional PCI could be associated with a non-serving Cell. Each of the additional PCI(s) could be associated with beam(s) (e.g., SSB) associated with the serving Cell. A non-serving cell is an activated non-serving cell if or when the UE performs inter-Cell mTRP operation on the non-serving cell. A non-serving cell is an activated non-serving cell if or when at least one beam associated with the non-serving cell is activated. A non-serving cell is a deactivated (or non-activated) non-serving cell if or when no beam associated with the non-serving cell is activated.

A (first and/or second) TRP of a Cell could be associated with or be replaced with a BFD-RS set of the Cell. Additionally and/or alternatively, the TRP of the Cell be associated with TCI state (e.g., via a TCI state id) of the Cell. Additionally and/or alternatively, the TRP could be associated with a CORESET pool (index) of the Cell. Additionally and/or alternatively, the TRP could be associated with a SRS resource set of the Cell.

A (first and/or second) TRP of the Cell could be associated with or be configured with or be replaced with a TAG. The (first and/or second) TRP of the Cell could be associated with a TA information. The UE could be configured with a first TAG and a second TAG of the Cell, wherein the first TAG could be associated with the first TRP and the second TAG could be associated with the second TRP.

All concepts, embodiments, and examples above and herein can be merged into new concepts and/or new concept combinations.

Referring to FIG. 15, with this and other concepts, systems, and methods of the present invention, a method 1000 for a UE in a wireless communication system comprises receiving, from a first cell, a first signaling indicative of Cell configuration of a second cell, wherein Cell configuration indicates a mapping between time alignment information and TRP(s) of the second cell (step 1002), receiving, from the first cell, a second signaling indicative of switching a SpCell of the UE to the second cell or adding the second cell as a serving cell, wherein the second signaling comprises at least one of a PDCCH signaling or a MAC CE (step 1004), switching the SpCell of the UE to the second cell or adding the second cell as a serving cell (step 1006), and applying a first time alignment information on a first TRP of the second cell based on the mapping in the first signaling, wherein the applying a second time alignment information on a second TRP of the second cell is based on the mapping in the first signaling (step 1008).

In various embodiments, the first signaling is a RRC message.

In various embodiments, the (first and second) time alignment information contains TAG id.

In various embodiments, the (first and second) time alignment information contains a timing advance (between uplink and downlink) of a TRP.

In various embodiments, the (first and second) time alignment information contains an index or an identity of a third cell, wherein the UE applies a timing advance associated with the third cell on the (first or second) TRP.

In various embodiments, the (first and second) time alignment information contains an index or an identity of a TRP of a third cell, wherein the UE applies a timing advance associated with the TRP of the third cell on the (first or second) TRP.

In various embodiments, the third cell is an activated (and not deactivated) cell of the UE before receiving the second signaling.

In various embodiments, the TRP(s) in the first signaling is indicated by a BFD-RS set id.

In various embodiments, the TRP(s) in the first signaling is indicated by a TCI state id.

In various embodiments, the TRP(s) in the first signaling is indicated by a CORESET pool index.

In various embodiments, the TRP(s) in the first signaling is indicated by a SRS resource set id.

In various embodiments, the first time alignment information and the second time alignment information are the same.

In various embodiments, the first time alignment information and the second time alignment information are different.

In various embodiments, the UE performs communication with a network via the first TRP and the second TRP on the second cell after switching the SpCell of the UE to the second cell or adding the second cell as a serving cell.

In various embodiments, the UE performs multi-TRP operation on the second cell via the first TRP and the second TRP after switching the SpCell of the UE to the second cell or adding the second cell as a serving cell.

In various embodiments, the first and/or the second information indicates the UE to perform multi-TRP operation on the second cell via the first TRP and the second TRP after switching the SpCell of the UE to the second cell or adding the second cell as a serving cell.

In various embodiments, the UE reuses a previous time alignment information associated with the second cell if the second cell is a non-serving cell.

Referring back to FIGS. 3 and 4, in one or more embodiments from the perspective of a first device, the device 300 includes a program code 312 stored in memory 310 of the transmitter. The CPU 308 could execute program code 312 to: (i) receive, from a first cell, a first signaling indicative of Cell configuration of a second cell, wherein Cell configuration indicates a mapping between time alignment information and TRP(s) of the second cell; (ii) receive, from the first cell, a second signaling indicative of switching a SpCell of the UE to the second cell or adding the second cell as a serving cell, wherein the second signaling comprises at least one of a PDCCH signaling or a MAC CE; (iii) switch the SpCell of the UE to the second cell or adding the second cell as a serving cell; and (iv) apply a first time alignment information on a first TRP of the second cell based on the mapping in the first signaling, wherein the applying a second time alignment information on a second TRP of the second cell is based on the mapping in the first signaling. Moreover, the CPU 308 can execute the program code 312 to perform all of the described actions, steps, and methods described above, below, or otherwise herein.

Referring to FIG. 16, with this and other concepts, systems, and methods of the present invention, a method 1010 for a UE in a wireless communication system comprises receiving, from a first cell, a first signaling indicative of Cell configuration of a second cell, wherein Cell configuration indicates a mapping between first time alignment information and a first TRP of the second cell (step 1012), receiving, from the first cell, a second signaling indicative of switching a SpCell of the UE to the second cell or adding the second cell as a serving cell, wherein the second signaling comprises at least one of a PDCCH signaling or a MAC CE (step 1014), switching the SpCell of the UE to the second cell or adding the second cell as a serving cell (step 1016), applying a first time alignment information on the first TRP of the second cell based on the mapping in the first signaling (step 1018), initiating a random access procedure on a second TRP (step 1020), and applying a second time alignment information on the second TRP of the second cell, wherein the UE obtains the second time alignment information based on at least the random access procedure (step 1022).

In various embodiments, the first signaling is a RRC message.

In various embodiments, the first time alignment information contains TAG id.

In various embodiments, the first time alignment information contains a timing advance (between uplink and downlink) of a TRP.

In various embodiments, the first time alignment information contains an index or an identity of a third cell, wherein the UE applies a timing advance associated with the third cell on the first TRP.

In various embodiments, the first time alignment information contains an index or an identity of a TRP of a third cell, wherein the UE applies a timing advance associated with the third cell on the first TRP.

In various embodiments, the third cell is an activated (and not deactivated) cell of the UE before receiving the second signaling.

In various embodiments, the TRP(s) in the first signaling is indicated by a BFD-RS set id.

In various embodiments, the TRP(s) in the first signaling is indicated by a TCI state id.

In various embodiments, the TRP(s) in the first signaling is indicated by a CORESET pool index.

In various embodiments, the TRP(s) in the first signaling is indicated by a SRS resource set id.

In various embodiments, the first signaling does not indicate time alignment information associated with the second TRP.

In various embodiments, the UE performs communication with a network via the first TRP and the second TRP on the second cell after switching the SpCell of the UE to the second cell or adding the second cell as a serving cell.

In various embodiments, the UE performs multi-TRP operation on the second cell via the first TRP and the second TRP after switching the SpCell of the UE to the second cell or adding the second cell as a serving cell.

In various embodiments, the first and/or the second information indicates the UE to perform multi-TRP operation on the second cell via the first TRP and the second TRP after switching the SpCell of the UE to the second cell or adding the second cell as a serving cell.

Referring back to FIGS. 3 and 4, in one or more embodiments from the perspective of a first device, the device 300 includes a program code 312 stored in memory 310 of the transmitter. The CPU 308 could execute program code 312 to: (i) receive, from a first cell, a first signaling indicative of Cell configuration of a second cell, wherein Cell configuration indicates a mapping between first time alignment information and a first TRP of the second cell; (ii) receive, from the first cell, a second signaling indicative of switching a SpCell of the UE to the second cell or adding the second cell as a serving cell, wherein the second signaling comprises at least one of a PDCCH signaling or a MAC CE; (iii) switch the SpCell of the UE to the second cell or adding the second cell as a serving cell; (iv) apply a first time alignment information on the first TRP of the second cell based on the mapping in the first signaling; (v) initiate a random access procedure on a second TRP; and (vi) apply a second time alignment information on the second TRP of the second cell, wherein the UE obtains the second time alignment information based on at least the random access procedure. Moreover, the CPU 308 can execute the program code 312 to perform all of the described actions, steps, and methods described above, below, or otherwise herein.

Referring to FIG. 17, with this and other concepts, systems, and methods of the present invention, a method 1030 for a UE in a wireless communication system comprises receiving, from a network, a first signaling indicative of cell configuration of a cell, wherein the cell is associated with a first TAG and a second TAG (step 1032), receiving, from the network, a second signaling indicative of switching a SpCell of the UE to the cell or adding the cell as a serving cell, wherein the second signaling comprises at least one of PDCCH signaling or a MAC CE (step 1034), receiving, from the network, a third signaling indicative of a first time alignment information associated with the first TAG, wherein the third signaling is the first signaling or the second signaling (step 1036), and in response to the second signaling: (1) switching the SpCell of the UE to the cell or adding the cell as the serving cell, (2) applying the first time alignment information on the first TAG, and (3) initiating a random access procedure on the cell when no time alignment information associated with the second TAG is in the third signaling (step 1038).

In various embodiments, the first time alignment information includes a TAG id of a third TAG of a second cell, or the first time alignment information contains a timing advance.

In various embodiments, association between the first time alignment information and the first TAG is indicated in the third signaling or the first time alignment information.

In various embodiments, the first TAG or a TAG id of the first TAG is indicated by the third signaling or the first time alignment information.

In various embodiments, the first TAG is associated with a first TRP, a first BFD-RS set, a first TCI state id, a first CORESET pool index or a first SRS resource set of the cell.

In various embodiments, the second TAG is associated with a second TRP, a second BFD-RS set, a second TCI state id, a second CORESET pool index, or a second SRS resource set of the cell.

In various embodiments, in response to the second signaling, the UE does not initiate the random access procedure on the cell if a second time alignment information associated with the second TAG is indicated in the third signaling.

In various embodiments, the UE acquires a second time alignment information associated with the second TAG via the random access procedure.

In various embodiments, wherein the UE is configured to perform UL transmissions via a first TRP and a second TRP on the cell via the first signaling.

In various embodiments, the UE performs multi-TRP operation on the cell with a first TCI state associated with the first TAG and a second TCI state associated with the second TAG after switching the SpCell of the UE to the cell or adding the cell as the serving cell.

In various embodiments, the UE performs the random access procedure on a second TRP associated with the second TAG.

In various embodiments, the UE does not have a valid time alignment information for the second TAG when the UE initiates the random access procedure on the cell.

Referring back to FIGS. 3 and 4, in one or more embodiments from the perspective of a first device, the device 300 includes a program code 312 stored in memory 310 of the transmitter. The CPU 308 could execute program code 312 to: (i) receive, from a network, a first signaling indicative of cell configuration of a cell, wherein the cell is associated with a first TAG and a second TAG; (ii) receive, from the network, a second signaling indicative of switching a SpCell of the UE to the cell or adding the cell as a serving cell, wherein the second signaling comprises at least one of PDCCH signaling or a MAC CE; (iii) receive, from the network, a third signaling indicative of a first time alignment information associated with the first TAG, wherein the third signaling is the first signaling or the second signaling; and (iv) in response to the second signaling: (1) switch the SpCell of the UE to the cell or adding the cell as the serving cell, (2) apply the first time alignment information on the first TAG, and (3) initiate a random access procedure on the cell when no time alignment information associated with the second TAG is in the third signaling. Moreover, the CPU 308 can execute the program code 312 to perform all of the described actions, steps, and methods described above, below, or otherwise herein.

Any combination of the above concepts or teachings can be jointly combined or formed to a new embodiment. The disclosed details and embodiments can be used to solve at least (but not limited to) the issues mentioned above and herein.

It is noted that any of the methods, alternatives, steps, examples, and embodiments proposed herein may be applied independently, individually, and/or with multiple methods, alternatives, steps, examples, and embodiments combined together.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects, concurrent channels may be established based on pulse repetition frequencies. In some aspects, concurrent channels may be established based on pulse position or offsets. In some aspects, concurrent channels may be established based on time hopping sequences. In some aspects, concurrent channels may be established based on pulse repetition frequencies, pulse positions or offsets, and time hopping sequences.

Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of ordinary skill in the art would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects, any suitable computer-program product may comprise a computer-readable medium comprising codes relating to one or more of the aspects of the disclosure. In some aspects, a computer program product may comprise packaging materials.

While the invention has been described in connection with various aspects and examples, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method of a User Equipment (UE), comprising:
receiving, from a network, a first signaling indicative of cell configuration of a cell, wherein the cell is associated with a first Timing Advance Group (TAG) and a second TAG, and the first signaling indicates an association between the first TAG and a first Transmission Configuration Indication (TCI) state;
receiving, from the network, a second signaling indicative of switching a Special Cell (SpCell) of the UE to the cell, the first TCI state, and a first time alignment information, wherein the second signaling comprises at least a Medium Access Control (MAC) Control Element (CE); and
in response to the second signaling indicating the switching, the first TCI state, and the first time alignment information:
switching the SpCell of the UE to the cell or adding the cell as the serving cell; and
applying the first time alignment information on the first TAG based on the association between the first TAG and the first TCI state in the first signaling.

2. The method of claim 1, wherein the first time alignment information contains a timing advance.

3. The method of claim 1, wherein the second signaling indicates the first TCI state via a TCI state identity (ID) of the first TCI state.

4. The method of claim 1, wherein the first TAG or a TAG ID of the first TAG is indicated by the first signaling.

5. The method of claim 1, wherein the first TAG is associated with a first Transmission Reception Point (TRP), a first Beam Failure Detection-Reference Signal (BFD-RS) set, a first TCI state ID, a first Control Resource Set (CORESET) pool index or a first Sounding Reference Signal (SRS) resource set of the cell, and the second TAG is associated with a second TRP, a second BFD-RS set, a second TCI state ID, a second CORESET pool index, or a second SRS resource set of the cell.

6. The method of claim 1, wherein the first signaling indicates a list of TCI states including the first TCI state.

7. The method of claim 1, wherein the UE acquires a second time alignment information associated with the second TAG via a random access procedure.

8. The method of claim 1, wherein the UE is configured to perform Uplink (UL) transmissions via a first TRP and a second TRP on the cell via the first signaling.

9. The method of claim 1, wherein the UE performs multi-TRP operation on the cell with the first TCI state associated with the first TAG and a second TCI state associated with the second TAG after switching the SpCell of the UE to the cell.

10. The method of claim 1, wherein the UE uses the first TCI state, indicated in the second signaling, for a mobility procedure to the cell.

11. A User Equipment (UE), comprising:
a memory; and
a processor operatively coupled to the memory, wherein the processor is configured to execute program code to:
receive, from a network, a first signaling indicative of cell configuration of a cell, wherein the cell is associated with a first Timing Advance Group (TAG) and a second TAG, and the first signaling indicates an association between the first tag and a first Transmission Configuration Indication (TCI) state;
receive, from the network, a second signaling indicative of switching a Special Cell (SpCell) of the UE to the cell, the first TCI state, and a first time alignment information, wherein the second signaling comprises at least a Medium Access Control (MAC) Control Element (CE); and
in response to the second signaling indicating the switching, the first TCI state, and the first time alignment information:
switch the SpCell of the UE to the cell or adding the cell as the serving cell; and
apply the first time alignment information on the first TAG based on the association between the first TAG and the first TCI state in the first signaling.

12. The UE of claim 11, wherein the first time alignment information contains a timing advance.

13. The UE of claim 11, wherein the second signaling indicates the first TCI state via a TCI state Identity (ID) of the first TCI state.

14. The UE of claim 11, wherein the first TAG or a TAG ID of the first TAG is indicated by the first signaling.

15. The UE of claim 11, wherein the first TAG is associated with a first Transmission Reception Point (TRP), a first Beam Failure Detection-Reference Signal (BFD-RS) set, a first TCI state ID, a first Control Resource Set (CORESET) pool index or a first Sounding Reference Signal (SRS) resource set of the cell, and the second TAG is associated with a second TRP, a second BFD-RS set, a second TCI state ID, a second CORESET pool index, or a second SRS resource set of the cell.

16. The UE of claim 11, wherein the first signaling indicates a list of TCI states including the first TCI state.

17. The UE of claim 11, wherein the UE acquires a second time alignment information associated with the second TAG via a random access procedure.

18. The UE of claim 11, wherein the UE is configured to perform Uplink (UL) transmissions via a first TRP and a second TRP on the cell via the first signaling.

19. The UE of claim 11, wherein the UE uses the first TCI state, indicated in the second signaling, for a mobility procedure to the cell.

20. The UE of claim 11, wherein the UE performs multi-TRP operation on the cell with the first TCI state associated with the first TAG and a second TCI state associated with the second TAG after switching the SpCell of the UE to the cell.

* * * * *